(12) United States Patent
Hedman et al.

(10) Patent No.: US 12,513,560 B2
(45) Date of Patent: Dec. 30, 2025

(54) NETWORK SLICE BIT RATE ENFORCEMENT

(71) Applicant: Telefonaktiebolaget LM Ericsson (publ), Stockholm (SE)

(72) Inventors: Peter Hedman, Helsingborg (SE); Ralf Keller, Würselen (DE); Juying Gan, Shanghai (CN); Paul Schliwa-Bertling, Ljungsbro (DE); Maria Belen Pancorbo Marcos, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 224 days.

(21) Appl. No.: 17/765,430

(22) PCT Filed: Sep. 30, 2020

(86) PCT No.: PCT/EP2020/077292
§ 371 (c)(1),
(2) Date: Mar. 30, 2022

(87) PCT Pub. No.: WO2021/063981
PCT Pub. Date: Apr. 8, 2021

(65) Prior Publication Data
US 2022/0369155 A1 Nov. 17, 2022

Related U.S. Application Data

(60) Provisional application No. 62/910,180, filed on Oct. 3, 2019.

(51) Int. Cl.
*H04W 28/02* (2009.01)
(52) U.S. Cl.
CPC .............. *H04W 28/0268* (2013.01)

(58) Field of Classification Search
CPC ................................. H04W 28/0268
See application file for complete search history.

(56) References Cited

U.S. PATENT DOCUMENTS

2018/0227873 A1 8/2018 Vrzic et al.
2018/0288582 A1* 10/2018 Buckley ............... H04W 12/06
(Continued)

FOREIGN PATENT DOCUMENTS

| CN | 108347736 A | 7/2018 |
| CN | 114531958 A | 5/2022 |

(Continued)

OTHER PUBLICATIONS

Partial Machine Translation of 10-2019-0116403, Sep. 20, 2019 (Year: 2019).*

(Continued)

*Primary Examiner* — Kevin M Cunningham
(74) *Attorney, Agent, or Firm* — Rothwell, Figg, Ernst & Manbeck, P.C.

(57) ABSTRACT

The present disclosure provides methods for providing network slice bit rate information and enforcing bit rate limitations. An exemplary method provides for receiving a network slice identifier identifying a network slice and corresponding network slice bit rate information (NS-BRI) for the identified network slice. The NS-BRI comprises i) first maximum bit rate information (MBRI) specifying a first maximum bit rate for the network slice and the user equipment, and/or ii) first guaranteed bit rate information (GBRI) specifying a first aggregate guaranteed bit rate for the network slice and the user equipment.

16 Claims, 13 Drawing Sheets

(56) References Cited

U.S. PATENT DOCUMENTS

| | | | |
|---|---|---|---|
| 2019/0166647 A1 | 5/2019 | Velev et al. | |
| 2020/0015117 A1* | 1/2020 | Wu | H04W 28/0268 |
| 2021/0105652 A1* | 4/2021 | Jeong | H04M 15/852 |
| 2022/0286895 A1* | 9/2022 | Lee | H04W 28/0257 |

FOREIGN PATENT DOCUMENTS

| | | | | |
|---|---|---|---|---|
| KR | 1020180005107 A | | 1/2018 | |
| KR | 10-2019-0116403 | * | 9/2019 | ........ H04W 28/0257 |
| WO | 2019074407 A1 | | 4/2019 | |

OTHER PUBLICATIONS

Machine Translation of Korean foreign application 10-2019-0116403 Sep. 18, 2020 (Year: 2019).*

Machine Translation of KR 10-2019-0122500 (Year: 2019).*

International Search Report and Written Opinion issued in International Application No. PCT/EP2020/077292, dated Dec. 14, 2020 (12 pages).

SA WG2, "New SID: Feasibility on Multimedia Priority Service (MPS) Phase 2, Stage 2", 3GPP TSG SA Meeting #85, SP-190931, Newport Beach, USA, Sep. 2019 (3 pages).

Anonymous: "NG.116—Generic Network Slice Template Generic Network Slice Template Version 1.0", GSMA, May 2019 (60 pages).

Nokia et al., "New WID Study on Enhancement of Network Slicing Phase 2", 3GPP TSG WG-A WG2 Meeting #134, S2-1908583, Sapporo, Japan, Jun. 2019 (3 pages).

3GPP TS 28.552 V16.3.0 (Sep. 2019), 3rd Generation Partnership Project; Technical Specification Group Services and System Aspects; Management and orchestration; 5G performance measurements (Release 16), Sep. 2019 (130 pages).

3GPP TS 28.541 V16.2.0 (Sep. 2019), 3rd Generation Partnership Project; Technical Specification Group Services and System Aspects; Management and orchestration; 5G Network Resource Model (NRM); Stage 2 and stage 3 (Release 16), Sep. 2019 (313 pages).

3GPP TS 23.501 V16.2.0 (Sep. 2019), 3rd Generation Partnership Project; Technical Specification Group Services and System Aspects; System Architecture for the 5G System (5GS): Stage 2 (Release 16), Sep. 2019 (391 pages).

3GPP TS 23.502 V16.2.0 (Sep. 2019), 3rd Generation Partnership Project; Technical Specification Group Services and System Aspects; Procedures for the 5G System (5GS); Stage 2 (Release 16), Sep. 2019 (525 pages).

GSM Association, "Generic Network Slice Template Version 1.0," GSMA, May 23, 2019 (60 pages).

3GPP TS 23.502 V16.1.0 (Jun. 2019) (500 pages).

* cited by examiner

NETWORK SLICE BIT RATE ENFORCEMENT

CROSS REFERENCE TO RELATED APPLICATIONS

This application is a 35 U.S.C. § 371 National Stage of International Patent Application No. PCT/EP2020/077292, filed Sep. 30, 2020, designating the United States and claiming priority to U.S. provisional application No. 62/910,180, filed on Oct. 3, 2019. The above identified applications are incorporated by reference.

TECHNICAL FIELD

Disclosed are embodiments related to network slicing in 5G.

BACKGROUND

FIG. 1 illustrates a reference point representation of an exemplifying wireless communication system 100 represented as a 5G network architecture comprising an Access network (AN) (e.g., a 5G Access Network (5G-AN), which is an access network comprising a Next Generation (NG) Radio Access Network (NG-RAN) and/or a non-3GPP access network connecting to a 5G Core Network)) and a Core network (CN) comprising network entities (NEs) in the form of network Functions (NFs). Typically, the AN comprises base stations, e.g. such as evolved Node Bs (eNBs) or 5G base stations (gNBs) or similar. As shown in FIG. 1, user equipments (UEs) connect to an AN as well as an Access and Mobility Management Function (AMF). As further shown in FIG. 1, the 5G CN NFs include: a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF).

The reference point representations of the 5G network architecture are used to develop detailed call flows in the normative standardization. The N1 reference point is defined to carry signaling between UE and AMF. The N2 and N3 reference points are defined to carry signaling between R(AN) and AMF and between R(AN) and UPF respectively. The N11 reference point is defined to carry signaling between AMF and SMF. The N4 reference point is defined to carry signaling between SMF and UPF. The N9 reference point is defined to carry signaling between different UPFs and the N14 reference point is defined to carry signaling between different AMFs. The reference points N15 and N7 are defined to carry signaling between PCF and AMF and SMF respectively. The N12 reference point is defined to carry signaling between AMF and AUSF. The N8 and N10 reference points are defined to carry signaling between UDM and AMF and SMF respectively. The N13 reference point is defined to carry signaling between AUSF and UDM. The N22 reference point is defined to carry signaling between NSSF and AMF.

The 5G core network separates user plane and control plane. The user plane carries user traffic (e.g. user data) while the control plane carries signaling in the network (although the control plane may also carry user data e.g., in SMS). In FIG. 1, the UPF is in the user plane while the other NFs, i.e., AMF, SMF, PCF, AF, AUSF, and UDM, are in the control plane. Separating the user plane and the control plane allows the resources in each plane to be scaled independently. It also allows UPFs to be deployed separately from control plane functions in a distributed fashion. For example, an UPF may be deployed very close to UEs to shorten the Round Trip Time (RTT) between UEs and data network for some applications requiring low latency.

The NFs in the 5G core network architecture are independent modularized functions, which allows independent evolution and scaling. Modularized function design enables the 5G core network to support various services in a flexible manner.

Each NF in the core network interacts with another NF directly, but it is possible to use intermediate functions to route messages from one NF to another NF.

FIG. 2 illustrates an exemplifying wireless communication system 200 represented as a 5G network architecture that uses service-based interfaces (SBIs) between the NFs in the control plane, instead of the point-to-point reference points/interfaces used in the 5G network architecture of FIG. 1. The NFs described above with reference to FIG. 1 correspond to the NFs shown in FIG. 2. The service(s) etc. that an NF provides to other authorized NFs can be exposed to the authorized NFs through an SBI. In FIG. 2 the SBIs are indicated by the letter "N" followed by the name of the NF, e.g. Namf for the SBI of the AMF and Nsmf for the SBI of the SMF etc. The network Exposure Function (NEF) and the NF Repository Function (NRF) in FIG. 2 are not shown in FIG. 1 discussed above. However, it should be clarified that all NFs depicted in FIG. 1 can interact with the NEF and the NRF of FIG. 2 as required, though not explicitly indicated in FIG. 1. A main difference between the point-to-point architecture in FIG. 1 and the service-based architecture in FIG. 2 is that the service-based architecture doesn't use predefined point to point interfaces between the NFs. Instead, an NF in the service-based architecture queries the NRF to discover and communicate with other NFs via the SBIs.

Some properties of the NFs shown in FIG. 1 and FIG. 2 may be described in the following manner. The AMF provides UE-based authentication, authorization and mobility management, etc. A UE even if using multiple access technologies is typically connected to a single AMF, since the AMF is independent of the access technologies. However, the UE can be connected to, for example, two AMFs if the UE is connected to two different PLMNs using separate types of access networks (e.g., the UE is connected to a first PLMN via a 3GPP access network and the UE is also connected to a second PLMN via a non-3GPP access network). The SMF is responsible for session management and allocates IP addresses to UEs and selects and controls the UPF for data transfer with respect to the UEs. If a UE has multiple PDU sessions, different SMFs may be allocated to each PDU session to manage them individually and possibly provide different functionalities per PDU session. The AF provides information on the packet flow to PCF responsible for policy control in order to support Quality of Service (QoS). Based on the information, PCF determines policies about mobility and session management to make AMF and SMF operate properly. The AUSF supports authentication function for UEs and thus stores data for authentication of UEs or similar while UDM stores subscription data of UEs. The Data network (DN), not part of the 5G core network, provides Internet access or operator services and similar.

The NRF supports the following functionality: 1) maintains the NF profile of available NF instances and their supported services; 2) allows other NF instances to subscribe to, and get notified about, the registration in NRF of new NF instances of a given type; and 3) supports a discovery function. It receives NF Discover requests from NF instances, and provides the information of the available NF instances fulfilling certain search criteria. Features of the NRF are specified in 3GPP Technical Specification (TS) 29.501 (see e.g. 3GPP TS 29.501 v16.0.0).

A number of 5G core network NFs of different types are typically instantiated per default in a 5G core network, e.g. such as an AMF, a NRF, a PCF and a SMF etc. Other 5G core network NFs may be instantiated as needed and several NFs of the same type can also be instantiated if required, e.g. to distribute load to additional NF(s) of the same typ. Thus, an NF instance may be seen as an example or a specimen of a certain NF. Herein, the terms NF and NF instance are used interchangeably, unless otherwise expressly stated or is apparent from the context in which the terms are used. An NF instance exposes one or more NF Service Instances.

GSMA PRD NG.116 describes a set of attributes that can be used by an operator to define a network slice template (NEST). Amongst those parameters are (parameters may change as discussions ongoing):

Below is an excerpt from GSMA PRD NG.116 v1.0 (accessed at www.gsma.com/newsroom/wp-content/uploads/NG.116-v1.0-4.pdf).

3.4.5 Downlink throughput per network slice

Is the achievable data rate of the network slice in downlink that is available ubiquitously across the coverage area of the slice?

Guaranteed downlink throughput

This attribute describes the guaranteed data rate supported by the network slice in downlink.

TABLE 1

Guaranteed Downlink Throughput Table

| Parameters | |
|---|---|
| Value | Float |
| Measurement unit | kbps |
| Example | 0 (not specified) |
|  | 10 Mbps |
| Tags | Scalability attribute |
|  | KPI |
| Parameter Presence | |
| Mandatory | X |
| Conditional | |
| Optional | |

Maximum downlink throughput

This attribute defines the maximum data rate supported by the network slice in downlink.

TABLE 2

Maximum Downlink Throughput Table

| Parameters | |
|---|---|
| Value | Integer |
| Measurement unit | kbps |
| Example | 100 Mbps |
|  | 20 Gbps |
| Tags | Scalability attributes |
|  | KPI |
| Attribute Presence | |
| Mandatory | |
| Conditional | X |
| Optional | |

Note: Either maximum downlink throughput per network slice or Maximum downlink throughput per UE shall be present.

Additional information

This attribute might be used to set throughput guarantees per network slice.

Maximum throughput can be used to offer different network slice contract qualities level, e.g. gold, silver and bronze which have different maximum throughput values.

Downlink throughput per UE

Guaranteed downlink throughput

This attribute describes the guaranteed data rate supported by the network slice per UE (User Equipment) in downlink, which is required to achieve a sufficient quality experience (dependent on the selected service type) and can be seen as a guaranteed throughput. If the value is 0, best effort traffic is expected where no minimum throughput is guaranteed.

TABLE 3

Guaranteed Downlink Throughput per UE Table

| Parameters | |
|---|---|
| Value | Integer |
| Measurement unit | Kbps |
| Example | 180 Kbps for VoIP traffic |
|  | 40.000-75.000 Kbps for entry level VR |
|  | 25.000 Kbps for cloud gaming |
|  | 0 (not specified) |
| Tags | Character attribute/Performance |
|  | KPI |
| Attribute Presence | |
| Mandatory | X |
| Conditional | |
| Optional | |

Maximum downlink throughput

This attribute describes the maximum data rate supported by the network slice per UE in downlink. These parameters could be used to offer different contract qualities like gold, silver and bronze.

TABLE 4

Maximum Downlink Throughput per UE Table

| Parameters | |
|---|---|
| Value | Integer |
| Measurement unit | Kbps |
| Example | Bronze customer: 50.000 Kbps |
|  | Silver customer: 400.000 Kbps |
|  | Gold customer: 1.000.000 Kbps |
|  | latency. |
| Tags | Character attribute/Performance |
|  | KPI |
| Attribute Presence | |
| Mandatory | |
| Conditional | X |
| Optional | |

Note: Either Maximum downlink throughput per network slice or Maximum downlink throughput per UE must be present.

Additional information

This attribute might be used to set different guarantees in terms of throughput experienced by the customer in downlink.

Minimum throughput can be defined in order to guarantee a minimum performance required to achieve a sufficient quality experience (dependent on the selected service type).

Maximum throughput can be used to offer different contract quality level, e.g. gold, silver and bronze which have different maximum throughput values.

Orchestrator may use this attribute to orchestrate the resources and (R)AN/CN may use this attribute to optimize the scheduling.

3.4.31 Uplink throughput per network slice

The achievable data rate of the network slice instance in uplink that is available ubiquitously across the coverage area of the network slice.

Guaranteed uplink throughput

This attribute describes the guaranteed data rate supported by the network slice in uplink. There are services (e.g. emergency services) where guaranteed uplink throughput is required.

TABLE 5

Guaranteed Uplink Throughput Table

| Parameters | |
|---|---|
| Value | Integer |
| Measurement unit | Bytes |
| Example | 0 (not specified) |
| | 10 Mbps |
| Tags | Scalability attribute |
| Attribute Presence | |
| Mandatory | |
| Conditional | |
| Optional | X |

Maximum uplink throughput

This attribute describes the maximum data rate supported by the network slice in uplink.

TABLE 6

Maximum Uplink Throughput Table

| Parameters | |
|---|---|
| Value | Integer |
| Measurement unit | Bytes |
| Example | 100 Mbps |
| | 10 Gbps |
| Tags | Scalability attribute |
| Attribute Presence | |
| Mandatory | |
| Conditional | X |
| Optional | |

Note: Either Maximum uplink throughput per network slice or Maximum uplink throughput per slice shall be present.

Additional information

This attribute might be used to set throughput guarantees per network slice (and not per user).

Minimum throughput can be defined to guarantee a minimum performance required to achieve a sufficient quality experience (dependent on the selected service type).

Maximum throughput can be used to offer different network slice contract qualities level, e.g. gold, silver and bronze which have different maximum throughput values.

Uplink throughput per UE

Guaranteed uplink throughput

This attribute describes the guaranteed data rate supported by the network slice per UE in uplink, required to achieve a sufficient quality experience (dependent on the selected service type). If the value is 0, best effort traffic is expected where no minimum throughput is guaranteed.

TABLE 7

Guaranteed Uplink Throughput per UE Table

| Parameters | |
|---|---|
| Value | Integer |
| Measurement unit | Kbps |
| Example | 180 Kbps for VoIP traffic |
| | 75.000 Kbps for entry level VR latency. |
| Tags | Character attribute/Functional KPI |
| Parameter Presence | |
| Mandatory | |
| Conditional | |
| Optional | X |

Maximum uplink throughput

This attribute describes the maximum data rate supported by the network slice per UE in uplink. These parameters could be used in order to offer different contract qualities like gold, silver and bronze.

TABLE 8

Maximum Uplink Throughput per UE Table

| Parameters | |
|---|---|
| Value | Integer |
| Measurement unit | Kbps |
| Example | Bronze customer: 10.000 Kbps |
| | Silver customer: 100.000 Kbps |
| | Gold customer: 200.000 Kbps |
| Tags | Character attribute/Functional KPI |
| Attribute Presence | |
| Mandatory | |
| Conditional | X |
| Optional | |

Note: Either Maximum uplink throughput per network slice or Maximum uplink throughput per UE must be present.

Additional information

This attribute might be used to set different guarantees in terms of throughput experienced by the customer in uplink.

Minimum throughput can be defined in order to guarantee a minimum performance required to achieve a sufficient quality experience (dependent on the selected service type).

Maximum throughput can be used to offer different contract qualities level, e.g. gold, silver and bronze which have different maximum throughput values.

Orchestrator may use this attribute to orchestrate the resources and (R)AN/CN may use this attribute to optimize the scheduling.

SUMMARY

Certain challenges presently exist. For example, 3GPP SA5 is developing OAM parameters to specify 5G performance measurements, and service profiles for network slices to also support parts of the GSMA PRD. Currently there is no way in 3GPP to monitor and enforce maximum UL and DL data rate per UE in a network slice. As an additional problem, SA2 SID does not cover the DL/UL throughput per network slice. As per GSMA, the parameters specify the achievable data rate of the network slice instance in uplink and downlink that is available ubiquitously across the coverage area of the network slice.

As currently understood, the data rates of the network slice represent what will be given to each UE using the network slice and are not understood as a "common resource" between the users.

However, a network slice is common to all of its users; for example, when one UE actively uses the shared resources, there are less resources for other users. Conventional systems and methods do not ensure that the limits of the common resources (in terms of data rates) of the network slice as agreed between the operator and a 3rd party are monitored and enforced.

In response to the inadequacies of conventional methods, as described above, the present disclosure provides for the monitoring and enforcement of maximum UL and/or DL data rates per UE and per network slice. In addition, the present disclosure provides for the monitoring and enforcement of maximum UL and/or DL data rates per network slice.

In one embodiment, the present disclosure provides a method, performed by a network function (NF), for providing network slice bit rate information. The method includes receiving, as part of a registration procedure, a message transmitted by a user equipment (UE), the message comprising a UE identifier for identifying the UE. The method also includes, after receiving the UE identifier, sending an information request requesting information linked to the UE identifier, the information request comprising the UE identifier. The method further includes receiving the requested information, wherein the received information comprises a network slice identifier identifying a network slice and corresponding network slice bit rate information (NS-BRI) for the identified network slice. The NS-BRI comprises: i) first maximum bit rate information (MBRI) specifying a first maximum bit rate for the network slice, and/or ii) first guaranteed bit rate information (GBRI) specifying a first aggregate guaranteed bit rate for the network slice.

In some embodiments, the first maximum bit rate information (MBRI) specifies a UE specific first maximum bit rate for the network slice and the UE, and/or first guaranteed bit rate information (GBRI) specifies a UE specific first aggregate guaranteed bit rate for the network slice and the UE.

In some embodiments, the network entity comprises an access and mobility management function (AMF) and/or a policy control function (PCF).

In some embodiments, the information request comprises an AM policy retrieval request message. In some embodiments, the message received as part of a registration procedure includes an NGAP Initial UE message. In some embodiments, the information request is a Nudm_SubscriberDataManagement_Get Request.

In some embodiments, the method further provides for sending the NS-BRI to a network entity of an access network (e.g., a gNB) and/or sending the NS-BRI to the UE.

In some embodiments, sending the NS-BRI to the network entity of the access network comprises sending an Initial Context Setup Request that comprises the NS-BRI. In some embodiments, sending the NS-BRI to the UE comprises sending to the UE a Registration Accept message that comprises the NS-BRI.

In some embodiments, the NS-BRI is for a specific access type (e.g., 3GPP access type or non-3GPP access type).

In another aspect there is provided a method, performed by a network entity (e.g., UE or gNB), for enforcing a bit rate limitation associated with a user equipment (UE) and a network slice. The method includes receiving a message comprising: i) a network slice identifier identifying the network slice and ii) corresponding network slice bit rate information (NS-BRI) for the identified network slice and for the UE, wherein the NS-BRI comprises: i) first maximum bit rate information (MBRI) specifying a first maximum bit rate for the network slice and the UE and/or ii) first guaranteed bit rate information (GBRI) specifying a first aggregate guaranteed bit rate for the network slice and the UE. The method also includes enforcing the bitrate limitation based on the NS-BRI.

In another aspect there is provided another method, performed by a network entity, for enforcing a bit rate limitation. The method includes receiving a request including a network slice identifier identifying a network slice and information associated with a user equipment (UE), wherein the request is: i) a request to establish a packet data unit (PDU) session for the UE, ii) a request to modify the PDU session, or iii) a request to activate a user plane (UP) for the PDU session. The method also includes, based on the network slice identifier and the information associated with the UE, obtaining corresponding network slice bit rate information (NS-BRI) for the identified network slice and for the UE, wherein the NS-BRI comprises: i) first maximum bit rate information (MBRI) specifying a first maximum bit rate for the network slice and the user equipment and/or ii) first guaranteed bit rate information (GBRI) specifying a first aggregate guaranteed bit rate for the network slice and the user equipment.

In another aspect another method is provided for enforcing a network slice bit rate limitation. The method includes receiving a request comprising i) a network slice identifier identifying a network slice and ii) bit rate value associated with the identified network slice. The method also includes using the network slice identifier, obtaining a network slice, NS, bit rate value for the identified network slice and a total bit rate value for the identified network slice. The method further includes determining, based on the bit rate value included in the request, the obtained NS bit rate value, and the obtained total bit rate value, whether or not to deny the request.

An advantage provided by the embodiments disclosed herein is that the 5GC is enhanced to control the data rate used for Network Slices per UE or common for all UEs

BRIEF DESCRIPTION OF THE DRAWINGS

The accompanying drawings, which are incorporated herein and form part of the specification, illustrate various embodiments.

DETAILED DESCRIPTION

In one embodiment, for a UE, network slice bit rate information (NS-BRI) for one or more network slices may be associated with a UE (e.g., added to the UE's subscription information). The NS-BRI for a particular network slice (or a particular network slice and a particular access type) may include: i) an uplink (UL) slice aggregate maximum bit rate (UL slice-AMBR) and/or a downlink (DL) slice-AMBR and/or ii) UL slice aggregate guaranteed bit rate (UL slice-AGBR) and/or DL slice-AGBR. The slice-AMBR limits the aggregate bit rate that can be expected to be provided across all non-GBR QoS flows of a network slice for the UE (or for the UE and an access type). The slice-AGBR limits the aggregate bit rate that can be expected to be provided across all GBR QoS flows of a network slice for the UE (or for the UE and the access type).

Figure 1:
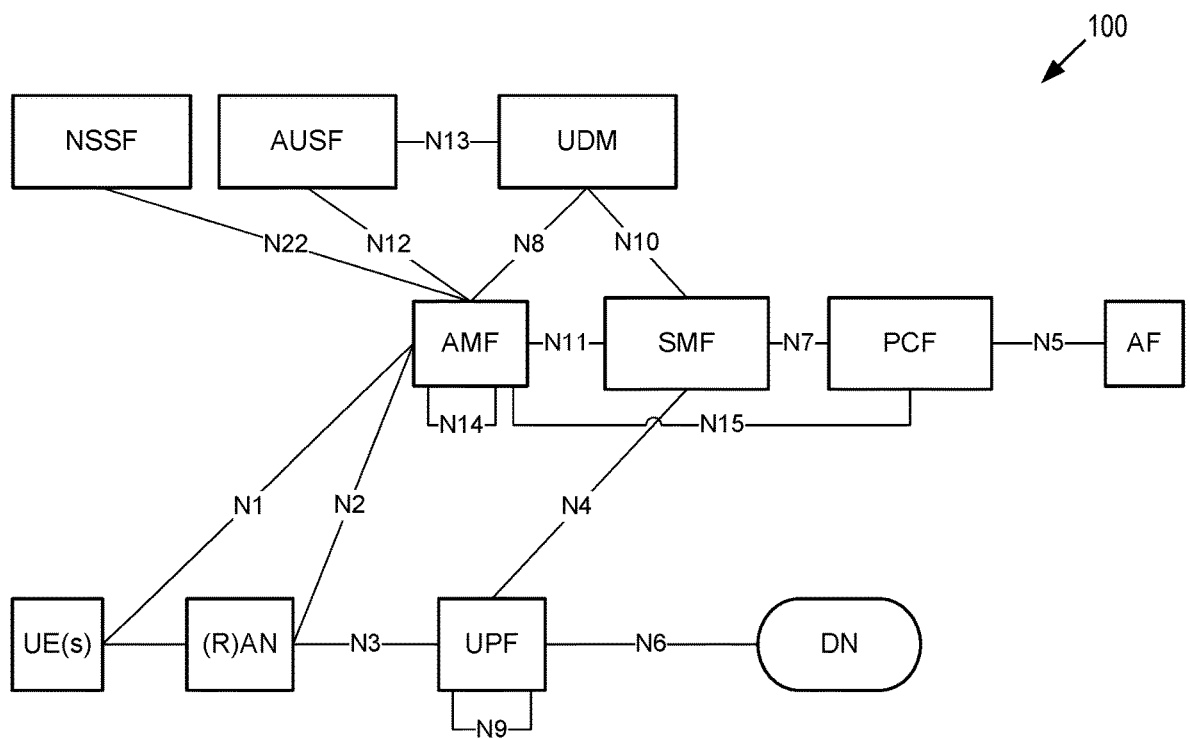
FIG. 1 illustrates a wireless communication system represented as a 5G network architecture composed of NFs using point to point reference points or interfaces.
Figure 2:
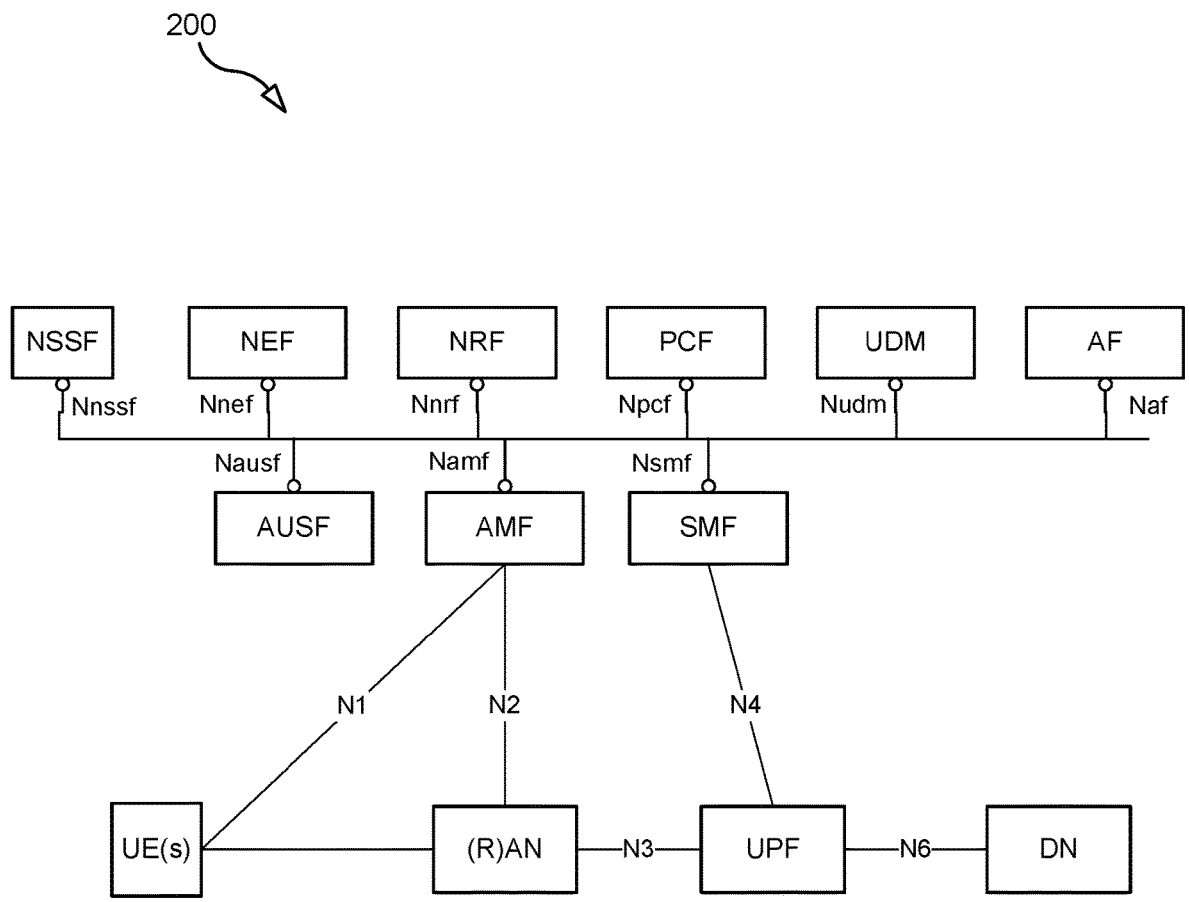
FIG. 2 illustrates a 5G network architecture using service-based interfaces (SBIs) between the NFs in the control plane, instead of the point-to-point reference points/interfaces used in the 5G network architecture of FIG. 1.
Figure 3:
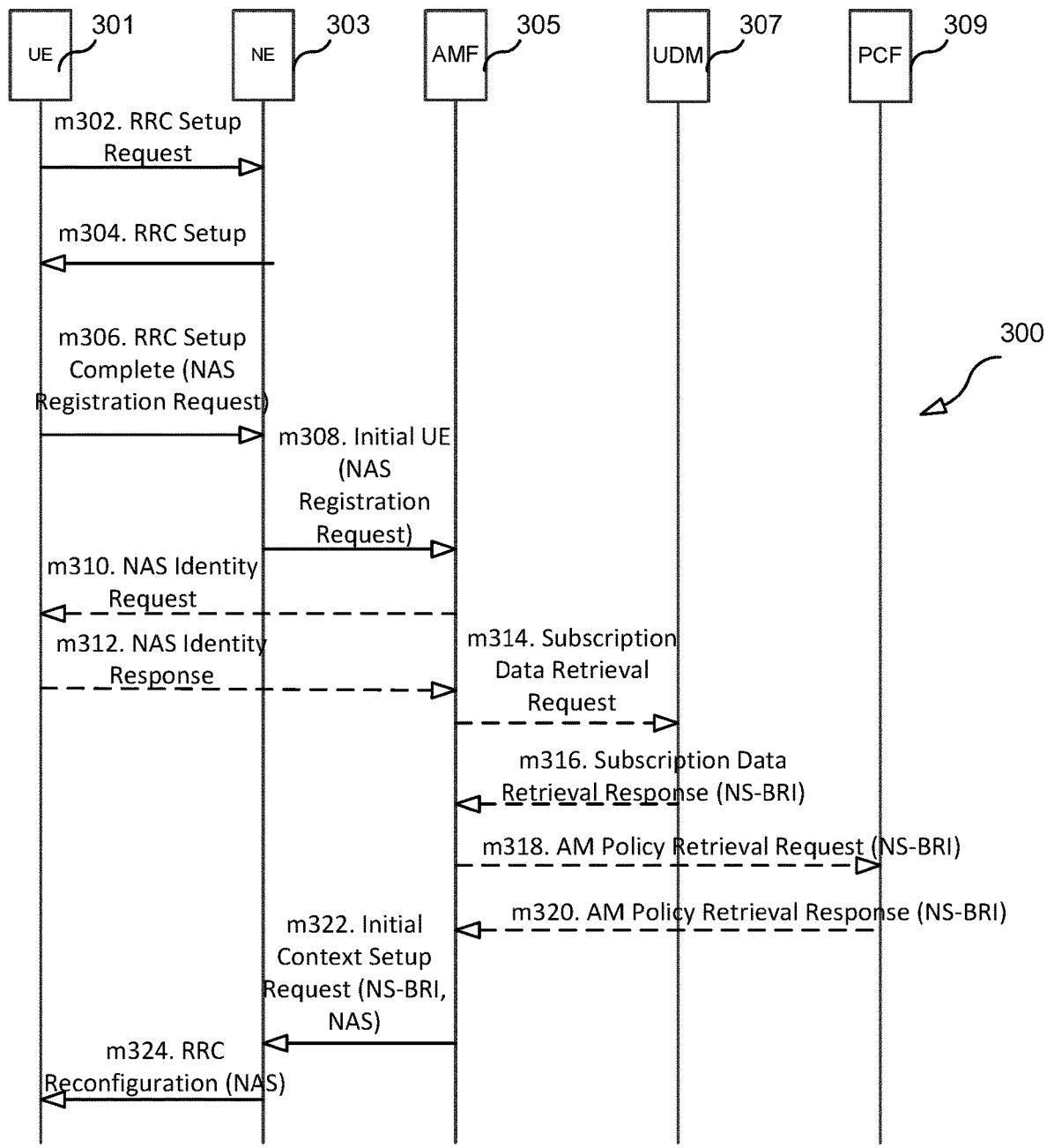
FIG. 3 is a message flow diagram illustrating an example message flow according to an embodiment.

In one embodiment, the slice-AMBR and/or slice-AGBR may be defined as subscription parameters in UDM and be possible to be changed by a PCF, as illustrated in FIG. 3. In another embodiment, the slice-AMBR and the slice-AGBR are defined as policy parameters that may be stored in UDR and then fetched by the PCF at the time the AM Policy data is retrieved for a UE within the slice and controlled by the PCF.

FIG. 3 is a message flow diagram illustrating an example registration flow 300 involving a UE 301, a NE 303 of an access network (e.g. a gNB), an AMF 305, a UDM 307, and a PCF 309.

The registration flow 300 begins with UE 301 sending to the NE 303 an RRC Setup Request message m302. An RRC Setup message m304 is then sent from NE 303 to UE 301 that confirms a Signaling Radio Bearer (SRB) is configured.

UE 301 then sends an RRC Setup Complete message m306 to NE 303. Message m306 includes a dedicated NAS message, which in this case is a NAS Registration Request. The NAS Registration Request may include: registration type, requested NSSAI, UE capability, and a list of PDU sessions.

NE 303 then sends an NG Application Protocol (NGAP) Initial UE message m308 to AMF 305, which includes the NAS registration request that was received from UE 301 in the RRC Setup Complete message m306. The Initial UE message m308 may also include: RAN UE NGAP ID, User Location Information, RRC Establishment Cause, SG-S-TMSI, and AMF Set ID. In some embodiments, AMF 305 obtains a UE permanent identity (e.g., the UE subscriber concealed identity (SUCI)) from the NAS registration request, as passed along in message m308 from message m306.

If AMF 305 does not receive the UE identity in m308, AMF 305 sends a NAS Identity Request message m310 which includes an identity request message. Therefore, AMF 305 requests the UE SUCI in message m308, if AMF 305 has not already received the UE identity information. In response, UE 301 sends a NAS Identity Response message m312, which includes a concealed identity, such as the SUCI, which conceals the UE subscriber permanent identity (SUPI).

In one embodiment, the present disclosure provides for, among other things, retrieving NS-BRI associated with, at the least, a network slice and UE 301. For example, the NS-BRI may be associated with the network slice, UE 301 and a particular access type. In the various embodiments, NS-BRI is retrieved (1) from UDM 307, (2) from PCF 309, or (3) retrieved from UDM 305 and sent to PCF 309.

NS-BRI Retrieved from UDM 307

AMF 305 sends a Subscription Data Retrieval Request message m314 to UDM 307 in order to retrieve the subscription data linked to the UE's SUPI. For example, message m314 is a Nudm_SubscriberDataManagement_Get Request.

In response, UDM 307 sends a Subscription Data Retrieval Response message m316 to AMF 305 which provides the requested subscription data. For example, message m316 is a Nudm_SubscriberDataManagement_Get response message. The subscription data, in this example, includes NS-BRI associated with a particular network slice as a defined subscription parameter. This NS-BRI included in the subscription data may also be associated with a particular access type (e.g., 3GPP or non-3GPP).

As noted above, the NS-BRI may include UL and/or DL slice-AMBR specifying a UL/DL aggregate maximum bit rate for the network slice and the UE (and access type if the NS-BRI is access type specific), and/or ii) UL and/or DL slice-AGBR specifying a UL/DL aggregate guaranteed bit rate for the network slice and the UE 301 (and access type if the NS-BRI is access type specific). In examples where UE 301 can use multiple network slices, the subscription data may include, for each network slice, NS-BRI for the network slice.

For example, assume that UE 301 can use network slice NS1 and network slice NS2, and further assume that UE 301 can access each one of these slices via either a 3GPP access network or a non-3GPP access network. In such a scenario, the subscription information for UE 301 may include the information shown in the table below:

| Access Type | Network Slice | NS-BRI for the corresponding network slice and the access type |
| --- | --- | --- |
| 3GPP | NS1 | NS-BRI-1a |
| Non-3GPP | NS1 | NS-BRI-1b |
| 3GPP | NS2 | NS-BRI-2a |
| Non-3GPP | NS2 | NS-BRI-2b |

In the example shown above, the NS-BRI corresponding to network slice NS1 and access type 3GPP is NS-BRI-1a.

In another embodiment, the NS-BRI for a particular UE is not access type specific, but only network slice specific as shown in the table below:

| Network Slice | NS-BRI for the corresponding network slice and the access type |
|---|---|
| NS1 | NS-BRI-1 |
| NS2 | NS-BRI-2 |

A slice-AMBR limits the aggregate bit rate that can be expected to be provided across all non-GBR quality of service (QoS) flows of a network slice for UE 301 (and access type if the NS-BRI is access type specific). A slice-AGBR limits the aggregate bit rate that can be expected to be provided across all GBR quality of service (QoS) flows of a network slice for UE 301.

NS-BRI Retrieved from PCF 309

AMF 305 may send an AM Policy Retrieval Request message m318 to PCF 309 in order to create a policy association and retrieve the UE policy and/or Access and Mobility control policy.

PCF 309 then sends an AM Policy Retrieval Response message m320 to UDM 307, responding with the policy association information. In this example, message m320 includes NS-BRI for one or more network slice as a defined policy parameter.

NS-BRI Retrieved from UDM 307 and Sent to PCF 309

AMF 305 sends message m314 to UDM 307 in order to retrieve the subscription data linked to the UE's SUPI. In response, UDM 307 sends a Subscription Data Retrieval Response message m316 to AMF 305 which provides the requested subscription data, which, in this example, includes NS-BRI.

AMF 305 then sends message m318 to PCF 309; message m318 includes the NS-BRI. PCF 309 then sends message m320 to AMF 305, which, in this example, includes the NS-BRI. In some embodiments, the NS-BRI of message m320 is unmodified from the NS-BRI that was originally received from UDM 307 in message 316. In other examples, the NS-BRI of message m320 is modified from the NS-BRI that was originally received from UDM 307 in message 316.

Response and Reconfiguration

After receiving the NS-BRI in any of the three embodiments discussed above, AMF 305 then sends an Initial Context Setup Request message m322 to NE 303, which includes i) a NAS-PDU: Registration Accept message, and ii) the NS-BRI for a network slice and UE 301 (e.g., a slice-AMBR value). Message m322 may further include a UE aggregate maximum bit rate (UE-AMBR) value and other information (e.g., a PDU Session ID, a PDU Session Uplink TEID, a UE IP Address, an S-NSSAI, etc). For example, message m322 is an Initial Context Setup Request.

NE 303 then sends a RRC Reconfiguration message m324 to UE 301 for, among other things, setting up radio bearers. Message m324 includes the Registration Accept message, which provides a 5GS registration result and a PDU session status. The Registration Accept message may also include, among other things, the NS-BRI and the S-NSSAI identifying the network slice to which the NS-BRI corresponds. If the NS-BRI is access type specific, then the Registration Accept message may also indicate that the NS-BRI for the S-NSSAI is only applicable for the specific access type.

NS-BRI Enforcement by the NE of Access Network (e.g., gNB)

In some embodiments, NE 303 receives NS-BRI for a UE and a particular network slice from AMF 305, as shown in FIG. 3. NE 303 enforces a bitrate limitation set to the value of the slice-AMBR. In some embodiments, the bitrate limitation is enforced separately for DL and UL directions.

In one example of enforcing the bitrate limitation, NE 303 uses a UE identifier, which points to a slice-AMBR for the UE and a particular network slice that limits the maximum bit rate for the associated network slice for the UE. The NE 303 identifies a record that tracks the ABR for the UE and the network slice (slice-ABR). The NE 303 schedules resource allocation based on the slice-ABR and the slice-AMBR for the UE. For example, if the slice-ABR exceeds the slice-AMBR, fewer resources are provided to the UE and/or resource allocation is de-prioritized or placed on a lower priority for the UE.

Figure 9:
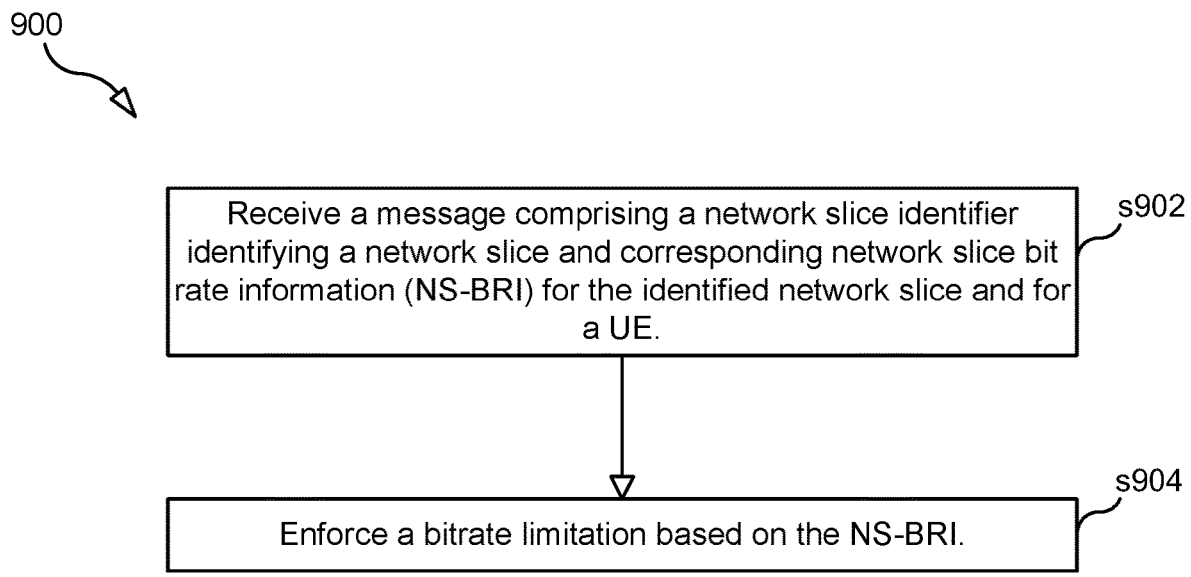
FIG. 9 is a flowchart illustrating a process according to an embodiment.

FIG. 9 shows an exemplary process 900 for enforcing a bit rate limitation associated with a UE and a network slice. For example, process 900 is performed by NE 303. Step s902 provides for receiving a message comprising a network slice identifier (e.g., S-NSSAI) identifying a network slice and corresponding NS-BRI for the identified network slice and for UE 301. In some embodiments, the received message is an Initial UE Context Setup Request, a UE Context Modification Request, or a Handover Request.

Step s904 comprises NE 303 enforcing a bit rate limitation based on the NS-BRI. In some embodiments, enforcing the bitrate limitation based on the NS-BRI comprises NE 303 performing the following steps: 1) NE 303 determining a slice-AMBR and/or a slice-AGBR for the UE based on the NS-BRI; 2) NE 303 using the network slice identifier and a UE identifier identifying the UE to obtain an slice aggregate bit rate (ABR) value for the identified network slice and for the UE (a.k.a., slice-ABR); and 3) NE 303 scheduling transmissions to or transmission from the UE based on the slice-ABR and the NS-BRI (e.g., the slice-AMBR included in the NS-BRI). For example, if the slice-ABR for the UE exceeds the slice-AMBR, then NE 303 may schedule UE 301 less often to reduce the UE's slice-ABR.

NS-BRI Enforcement by UE

In some embodiments, as shown in FIG. 3, NS-BRI (e.g., slice-AMBR and/or slice-AGBR) are provided to UE 301 by AMF 305 and UE 303 enforces a bit rate limitation using the NS-BRI (i.e., in some embodiments process 900 is performed by UE 301). For example, in one embodiment, UE 301 monitors the UE's ABR across PDU sessions within the same network slice. For example, this is process is similar to APN-AMBR in EPS, in which case a UE monitors all PDN Connections for the same DNN.

In another embodiment, UE 301 enforces a bit rate limitation based on the NS-BRI by determining whether UE 301 has reached a bit rate limitation for a network slice and refrains from requesting UL transmission grants based on determining that UE 301 has exceeded the bit rate limitation. As another example, UE 301 may refrain from requesting the establishment of a new PDU session if the sum of the Session-AMBRs for the UE's existing PDU sessions over the network slice is greater than a threshold value based on the slice-AMBR for the network slice.

NS-BRI Enforcement by Session-AMBR for UE 301

Figure 4:
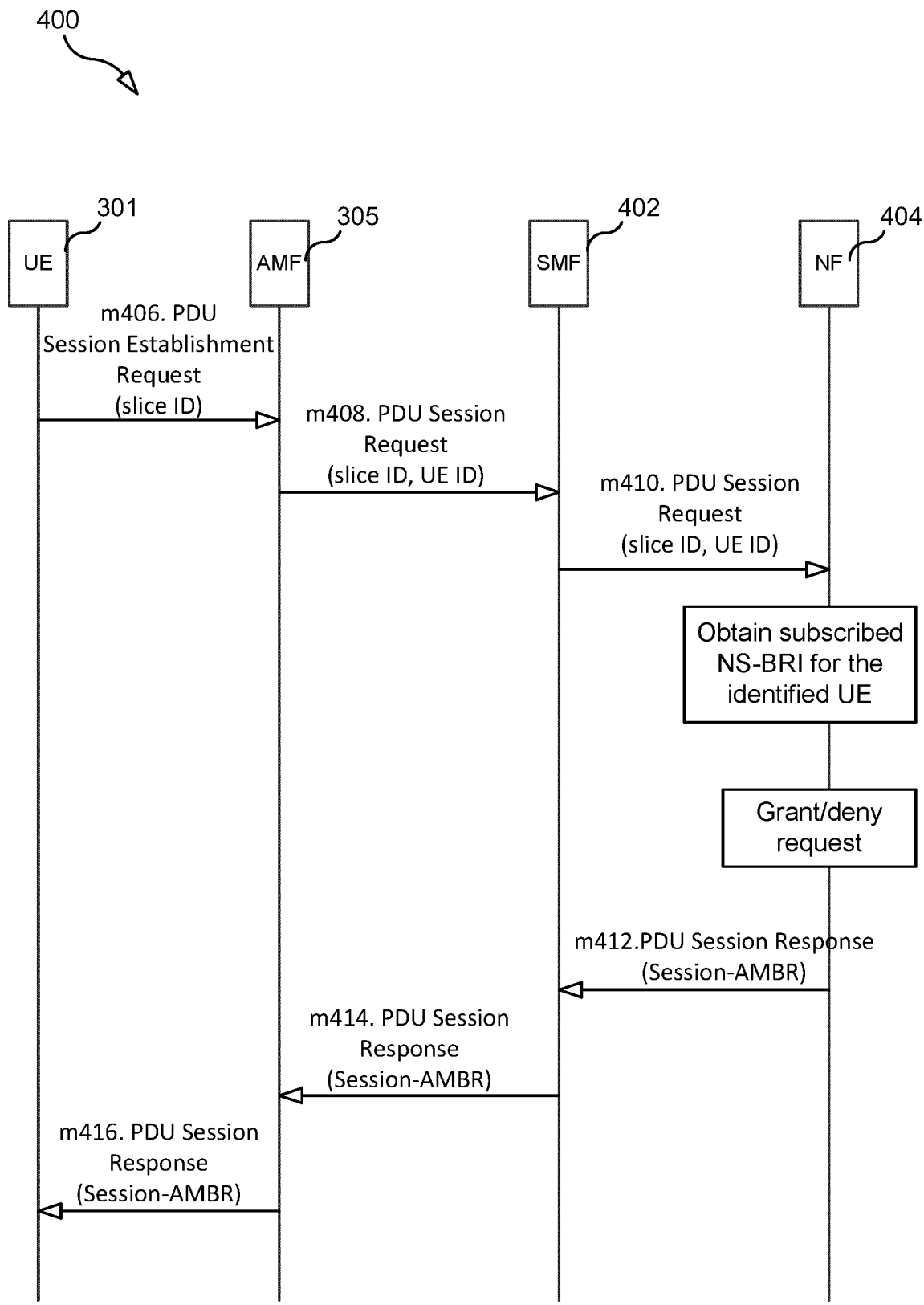
FIG. 4 is a message flow diagram illustrating an example message flow according to an embodiment.

The slice-AMBR and slice-AGBR may be enforced by a network function (NF) 404 (as shown in FIG. 4).

For a given network slice, the sum of Session-AMBRs for each PDU Session for UE 301 (either all PDU Sessions or for PDU Sessions with active User Plane) are monitored by NF 404. NF 404 may be any of UDM 307, AMF 305, PCF 309, SMF 402, or a newly-defined network function. Therefore, new PDU sessions or activation of User planes are accepted for the network slice until the UE slice-AMBR is reached. After that, either no more PDU Sessions are accepted, or no more activation of User planes are accepted, or some Session-AMBR of one or more PDU sessions gets a lower value as to fit the new PDU Session.

For example, where two PDU sessions for UE 301, each with a Session-AMBR of 5 are provided on a network slice with a slice-AMBR threshold of 10, subsequent PDU sessions for UE 301 cannot be allowed because the maximum bit rate is already reached. In some embodiments, the NF 404 determines that the threshold slice-AMBR is reached, the NF 404 lowers the existing PDU sessions to, for example, MBRs of 3, to fit in the new PDU session at 3.

In some embodiments, the NF 404 further determines that the slice-AMBR threshold is not yet reached, but would be exceeded with the new, requested PDU session. Accordingly, the NF 404 determines to lower the Session-AMBR of at least one of: any one of the existing PDU sessions and the new, requested PDU session.

The entity determining the aggregate bit rate information for all PDU sessions associated with a network slice the calculation (e.g., any of: UDM 307, AMF 305, PCF 309, SMF 402, or NF 404) is selected for all PDU sessions for the network slice. The entity is invoked for all PDU session establishments, PDU session modifications and PDU session release. The entity is also invoked when user plane is activated and de-activated.

Referring now to FIG. 4, an exemplary message flow 400 for NS-BRI enforcement is shown, which involves a UE 301, an AMF 305, a SMF 402, and an NF 404. UE 301 sends a PDU Session Establishment Request message m406 to AMF 305. Message m406 includes a network slice identifier, such as, for example, an S-NSSAI.

AMF 305 then sends a PDU Session Request message m408 to SMF 402. Message m408 includes the network slice identifier and a UE identifier.

SMF 402 then sends a PDU Session Request message m410 to NF 404. Message m410 includes the network slice identifier and the UE identifier.

In response, NF 404 obtains NS-BRI for the identified UE 301 and network slice and determines whether or not to grant the PDU session request based on the obtained NS-BRI, which in this example contains a UE slice-AMBR value. For example, after obtaining the UE slice-AMBR, NF 404 checks whether the UE slice-AMBR would be exceeded if the PDU session for the UE was granted. For example, the NF 404 maintains a total UE Session-AMBR value (i.e., the sum of all Session-AMBRs for the UE's PDU sessions established on the identified network slice) and determines whether the total Session-AMBR is at or exceeds the UE slice-AMBR value for the network slice. NF 404 then grants or denies the request, in accordance with the various embodiments discussed herein. For example, NF 404 can modify the requested Session-AMBR and/or modify existing Session-AMBRs of other of the UE's PDU sessions.

In some embodiments, if NF 404 grants the request, NF 404 selects a Session-AMBR for the requested PDU session based on the UE slice-AMBR. In some embodiments, the selected Session-AMBR is different than a Session-AMBR requested by UE 301. In some embodiments, NF 404 determines to grant the requested PDU session and to further modify existing PDU sessions, associated with UE 301 and the network slice. NF 404 then sends a PDU Session Response message m412, which includes a Session-AMBR.

The SMF 402 then sends a PDU Session Response message m414 to the AMF 3015, which includes the selected Session-AMBR for the requested PDU session.

The AMF 305 then sends a PDU Session Response message m416 to the UE 301, which includes the selected Session-AMBR. Enforcement of the Session-AMBR is performed in the conventional manner.

Enforcing NS-BRI per Network Slice

In some embodiments, the present disclosure provides for an entity, referred to as a "Network Slice Monitor (NSM)" to monitor slice-AMBR and/or slice-AGBR for a network slice. In this example, the slice-AMBR and slice-AGBR is not UE specific, only slice specific (or slice and access type specific). The NSM may be standalone or co-located with another network function, including, for example, NWDAF, NS SF, or PCF. The slice-AMBR and/or the slice-AGBR limits may be stored in UDR as a new data set, which has a data key set to S-NSSAI (as opposed to a UE data key).

When network slice resources are to be used for data (e.g., user data), an NF (e.g., an AMF or an SMF) sends a request to the NSM to grant access to the resources. The NSM keep count of resources requested for the network slice. As long as the requests are within the limits agreed for the network slice (e.g., the slice-AMBR), the request is granted. If the slice-AMBR and/or the slice-AGBR limit for the network slice has been reached then the request is rejected, or other users' resources are pre-empted or modified before the request is granted. The NSM may also interact with NWDAF to be informed on how much resources are actually used; therefore, a request may be granted even if the max limit for the network slice was already reached, relying on the knowledge that the resources have been requested but are not used. In some embodiments, this involves machine learning in order to know how much resources can be overcommitted without actually violating the max limit, in reality.

In some embodiments, the resource allocation occurs: (1) when a UE registers to a network slice, in order to limit the per UE slice-AMBR, as in FIG. 5; (2) at the point of PDU Session establishment, in order to limit per Session-AMBR, as in FIG. 6; or (3) when new QoS Flows are added in a request for higher Session-AMBR or GFBR/GFBR per QoS Flow, as in FIG. 7; or when a User Plane is activated. To limit signaling, the accuracy to monitor the data rate for User Plane activation and de-activations can optionally be turned on/off.

Resource Allocation when a UE First Registers to a Network Slice

Figure 5:
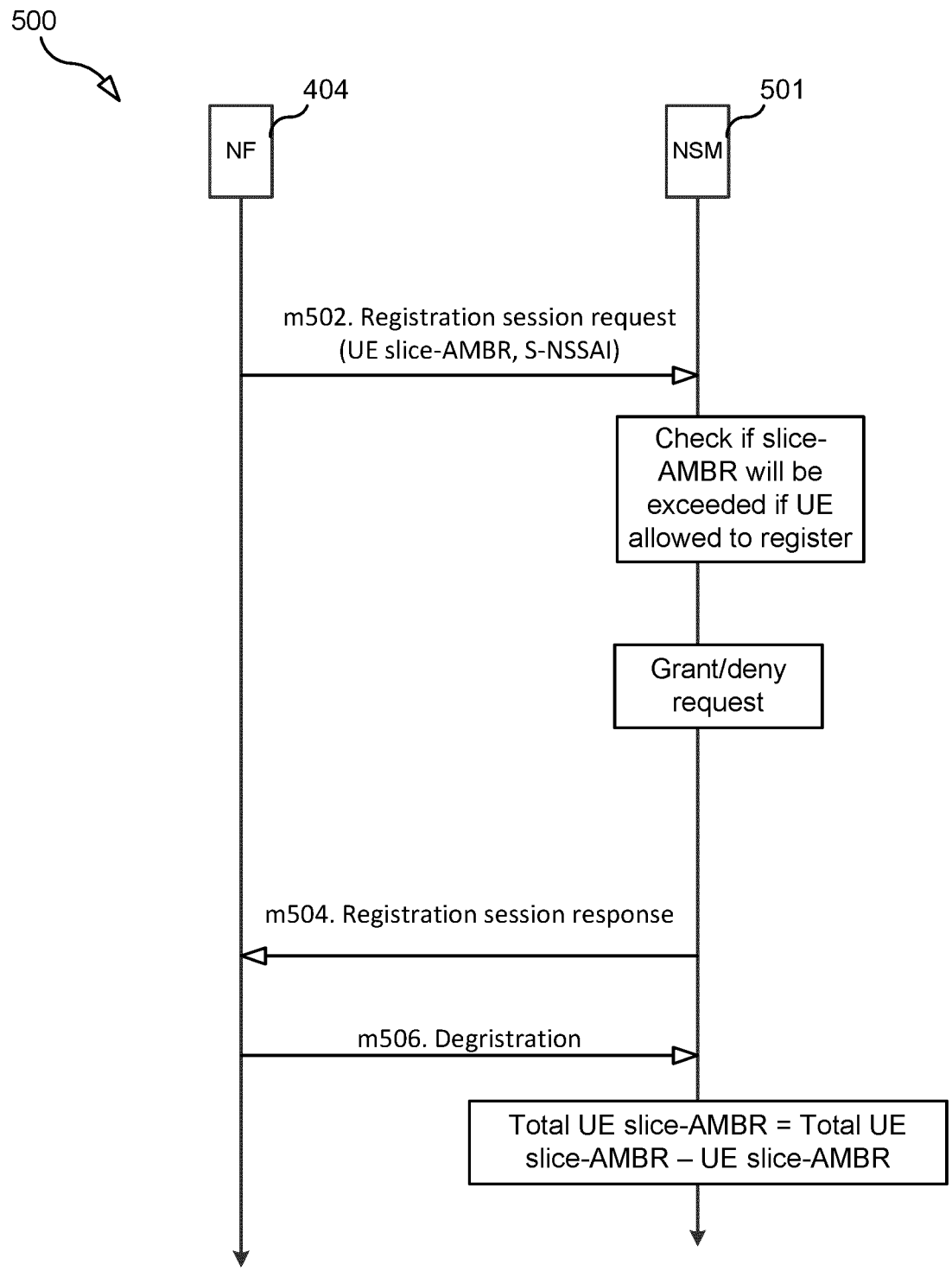
FIG. 5 is a message flow diagram illustrating an example message flow according to an embodiment.

FIG. 5 shows an exemplary message flow 500. As shown in FIG. 5, NF 404 sends a registration session request message m502 to an NSM 501. Message m502 includes a UE slice-AMBR for a UE requesting a registration and an S-NSSAI identifying the network slice to which the UE slice-AMBR applies. In embodiments where NF 404 is AMF 305, AMF 305 may send message m502 immediately after AMF 305 receives the UE slice-AMBR for the UE (see, e.g., messages m316 and m320).

After receiving message m502, NSM 501 then checks whether the slice-AMBR for the identified network slice would be exceeded if the UE was allowed to register with the UE slice-AMBR. For example, the NSM 501 maintains a total UE slice-AMBR value (i.e., the sum of all UE slice-AMBRs for the UEs that are currently using the network slice) and determines whether the total UE slice-AMBR value plus the UE slice-AMBR value received in message m502 would exceed the slice-AMBR value.

That is, in some embodiments, NSM 501, using a network slice identifier (e.g., the S-NSSAI) obtains a network slice bit rate value for the identified network slice (e.g., the slice-AMBR value) and an aggregate bit rate value for the identified network slice (e.g., the total UE slice-AMBR value). NSM 501 further determines, based on a UE bit rate value (e.g., the UE slice AMBR from message m502), the network slice bit rate value, and the aggregate bit rate value, whether to accept or deny the registration request.

Referring back to FIG. 5, NSM 501 then grants or denies the request, in accordance with the various embodiments discussed herein. For example, NSM 501 can modify the requested UE slice-AMBR and/or modify existing UE slice-AMBRs of other UEs.

The NSM 501 then sends a registration session response message m504, which grants the request, denies the request, and/or modifies the UE slice-AMBR.

When the UE is deregistered, NF 404 sends to NSM 501 a deregistration message m506, which contains a slice identifier, so that NSM 501 can reduce the total UE slice-AMBR value for the identified slice by an amount equal to the UE's slice-AMBR, as shown in FIG. 5. Thus, in some embodiments, message m506 includes not only the slice identifier, but also information identifying the UE's slice-AMBR.

Resource Allocation when a PDU Session is Established

Figure 6:
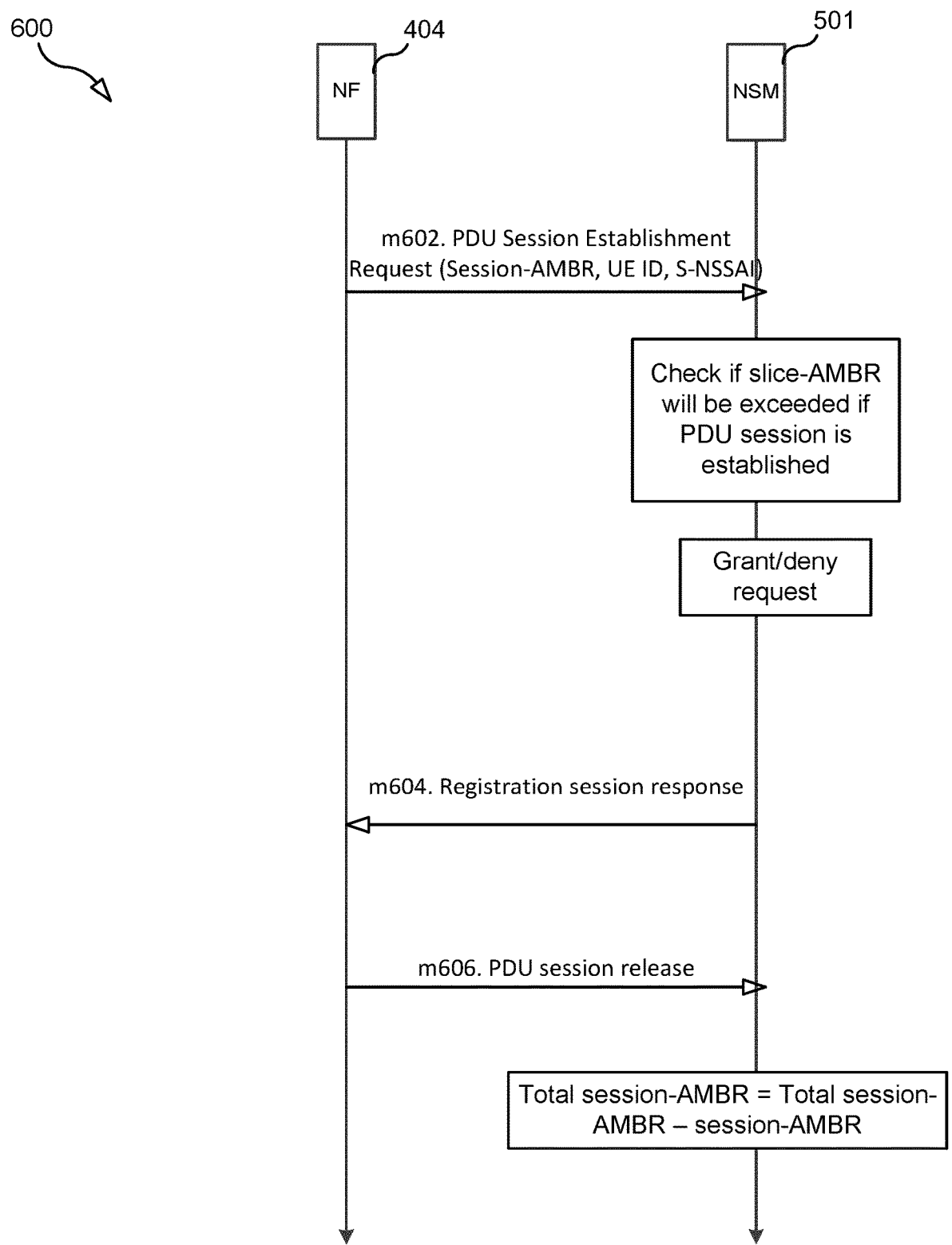
FIG. 6 is a message flow diagram illustrating an example message flow according to an embodiment.

FIG. 6 shows an exemplary message flow 600. As shown in FIG. 6, NF 404 sends a PDU session establishment request message m602 to NSM 501, which includes a Session-AMBR for a UE and a network slice identifier identifying a network slice.

After receiving message m602, NSM 501 then checks whether the slice-AMBR for the identified network slice would be exceeded if the PDU session for the UE was established with the Session-AMBR. For example, the NSM 501 maintains a total Session-AMBR value (i.e., the sum of all Session-AMBRs for the UEs that are currently using the network slice) and determines whether the total Session-AMBR value plus the Session-AMBR value received in message m602 would exceed the slice-AMBR value.

NSM 501 then grants or denies the request, in accordance with the various embodiments discussed herein. For example, NSM 501 can modify the requested Session-AMBR and/or modify existing Session-AMBRs of other UEs and/or the UE associated with the UE ID.

NSM 501 then sends a registration session response message m604, which grants, denies, and/or modifies the request.

When the PDU session is released, NF 404 sends to NSM 501 a PDU session release notification message m606, which contains a slice identifier, so that NSM 501 can reduce the total Session-AMBR value for the identified slice by an amount equal to the Session-AMBR value for the PDU session, as shown in FIG. 6. Thus, in some embodiments, message m606 includes not only the network slice identifier, but also information identifying the Session-AMBR for the PDU session being released.

Resource Allocation when New QoS Flows are Added

Figure 7:
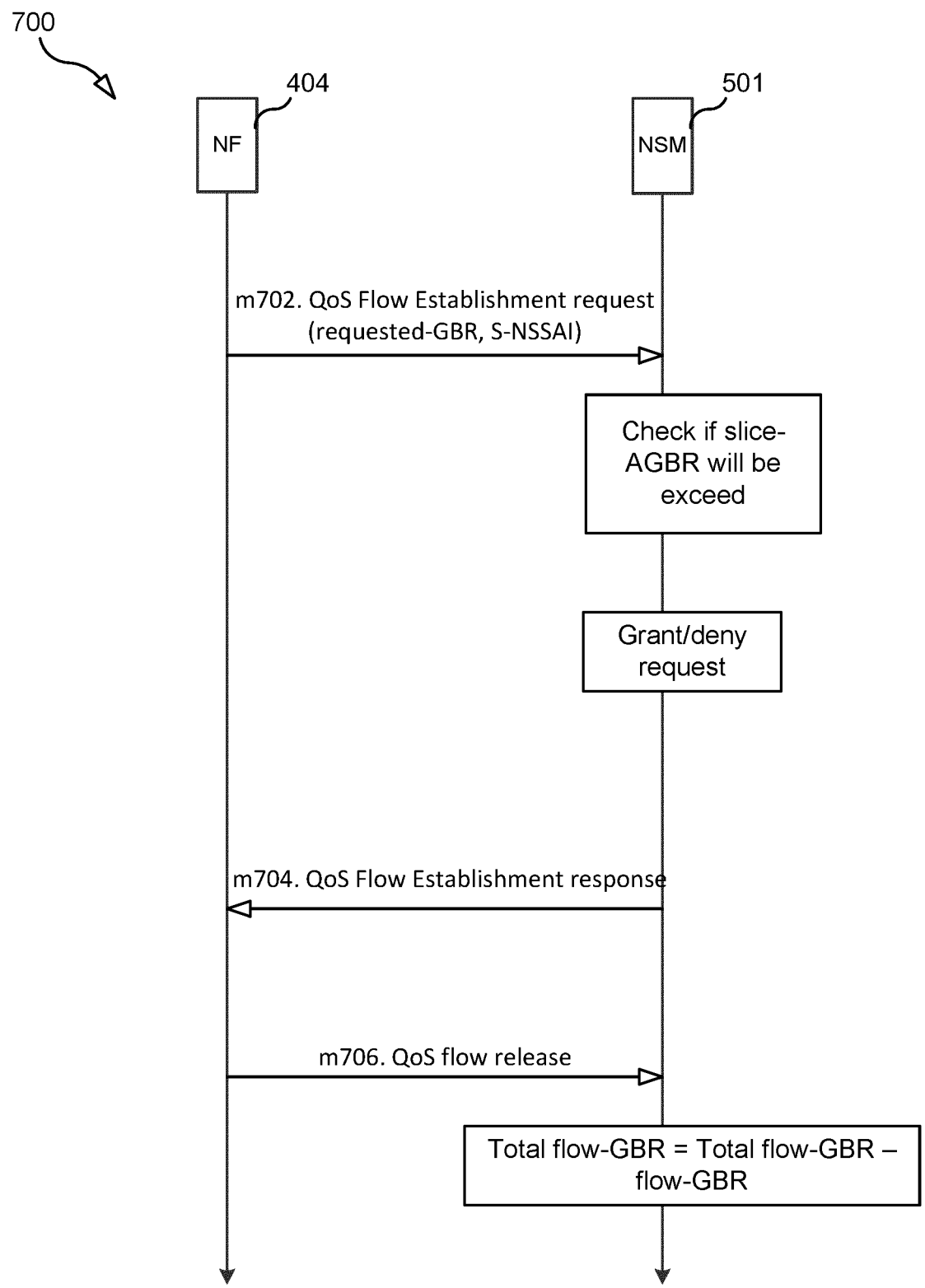
FIG. 7 is a message flow diagram illustrating an example message flow according to an embodiment.

FIG. 7 shows an exemplary message flow 700. As shown in FIG. 7, NF 404 sends a QoS Flow Establishment Request message m702 to NSM 501. Message m702 includes a network slice identifier identifying a network slice and information identifying a requested guaranteed bit rate for a requested QoS flow on the identified network slice (requested flow-GBR).

After receiving message m702, NSM 501 checks whether the slice-AGBR for the identified network slice would be exceeded if the requested QoS flow was established with the requested flow-GBR. For example, the NSM 501 maintains a total flow-GBR value (i.e., the sum of all flow-GBR values for the GBR QoS flows that are currently being using on the network slice) and determines whether the total flow-GBR value plus the requested flow-GBR value received in message m702 would exceed the slice-AGBR value.

NSM 501 then grants or denies the request, in accordance with the various embodiments discussed herein. For example, NSM 501 can modify the requested flow-GBR and/or modify existing flow-GBRs of other existing QoS flows so that the slice-AGBR value would not be exceeded.

The NSM 501 then sends a response message m704, which grants, denies, and/or modifies the request.

When the QoS flow is released, NF 404 sends to NSM 501 a QoS flow release notification message m706, which contains a slice identifier, so that NSM 501 can reduce the total flow-GBR value for the identified slice by an amount equal to the flow-GBR value for the GBR flow that is being released, as shown in FIG. 7. Thus, in some embodiments, message m706 includes not only the network slice identifier, but also information identifying the GBR for the flow being released.

Methodology for Enforcing a Network Slice Bit Rate Limitation

Figure 11:
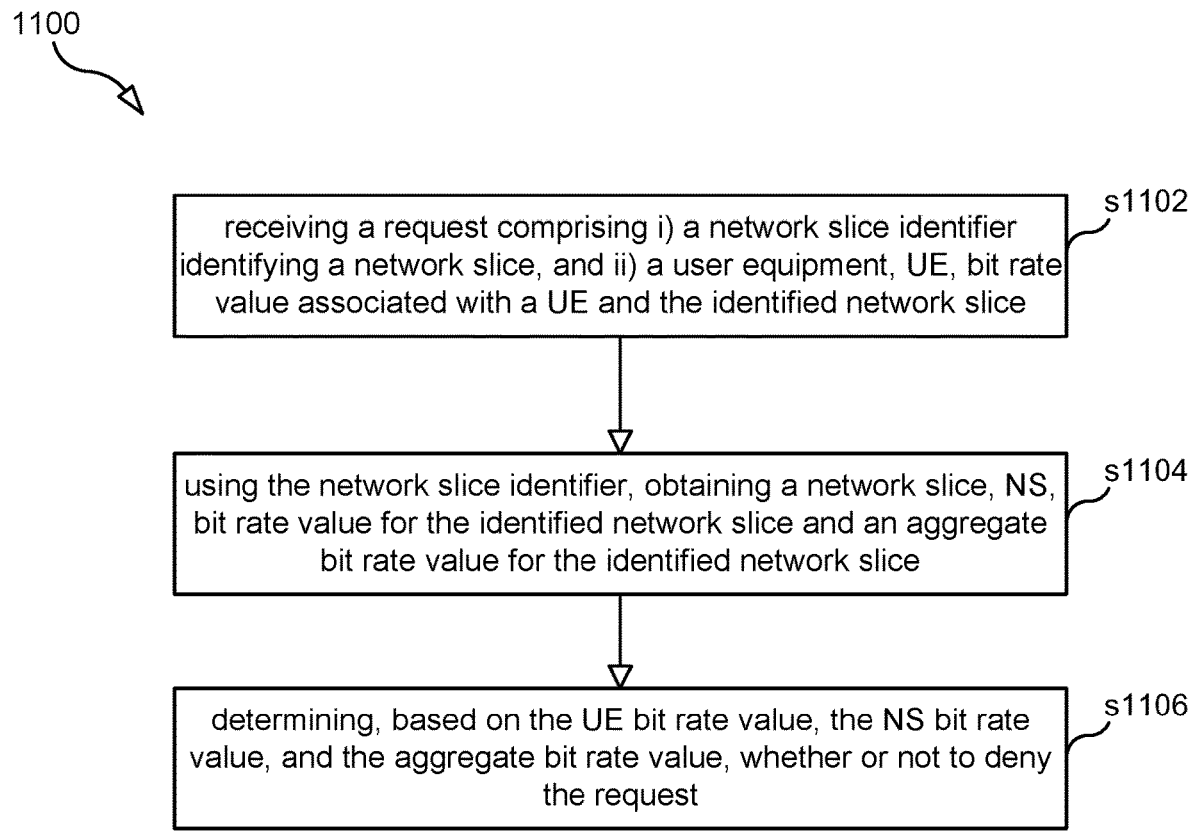
FIG. 11 is a flowchart illustrating a process according to an embodiment.

Referring now to FIG. 11, an exemplary process 1100 is shown for enforcing a network slice bit rate limitation. Process 1100 may begin in step s1102.

Step s1102 comprises receiving a request comprising: i) a network slice identifier identifying a network slice and ii) bit rate value associated with the identified network slice. The bit rate value associated with the identified network slice may be any of: a requested flow-GBR value, a Session-AMBR value, or a UE slice-AMBR value, as described above in connection with FIGS. 5, 6, and 7. In some embodiments, the request comprises a registration request, a PDU session establishment request, or a QoS flow establishment request.

Step s1104 comprises using the network slice identifier to obtain a network slice (NS) bit rate value for the identified network slice and a total bit rate value for the identified network slice. The obtained NS bit rate value may be any of: a slice-AMBR value or a slice-AGBR value as described above in connection with FIGS. 5, 6, and 7.

Step s1106 comprises determining, based on the bit rate value included in the request (e.g., UE slice-AMBR, Session-AMBR, flow-GBR), the obtained NS bit rate value (e.g., slice-AMBR or slice-AGBR), and the obtained total bit rate value, whether or not to deny the request.

NS-BRI Enforcement by Access Type

As described above, a slice-AMBR may be set per access type, or per RAT. In such case, NE 303 enforces a bitrate limitation set to the value of the slice-AMBR (separately for DL and UL direction), and, when value for the RAT is reached, then UE 301 is directed to another RAT, which has remaining quota. Also, if a quota for an Access Type is reached then UE 301 is directed to another Access Type, which has remaining quota.

Method for Providing Bit Rate Information

Figure 8:
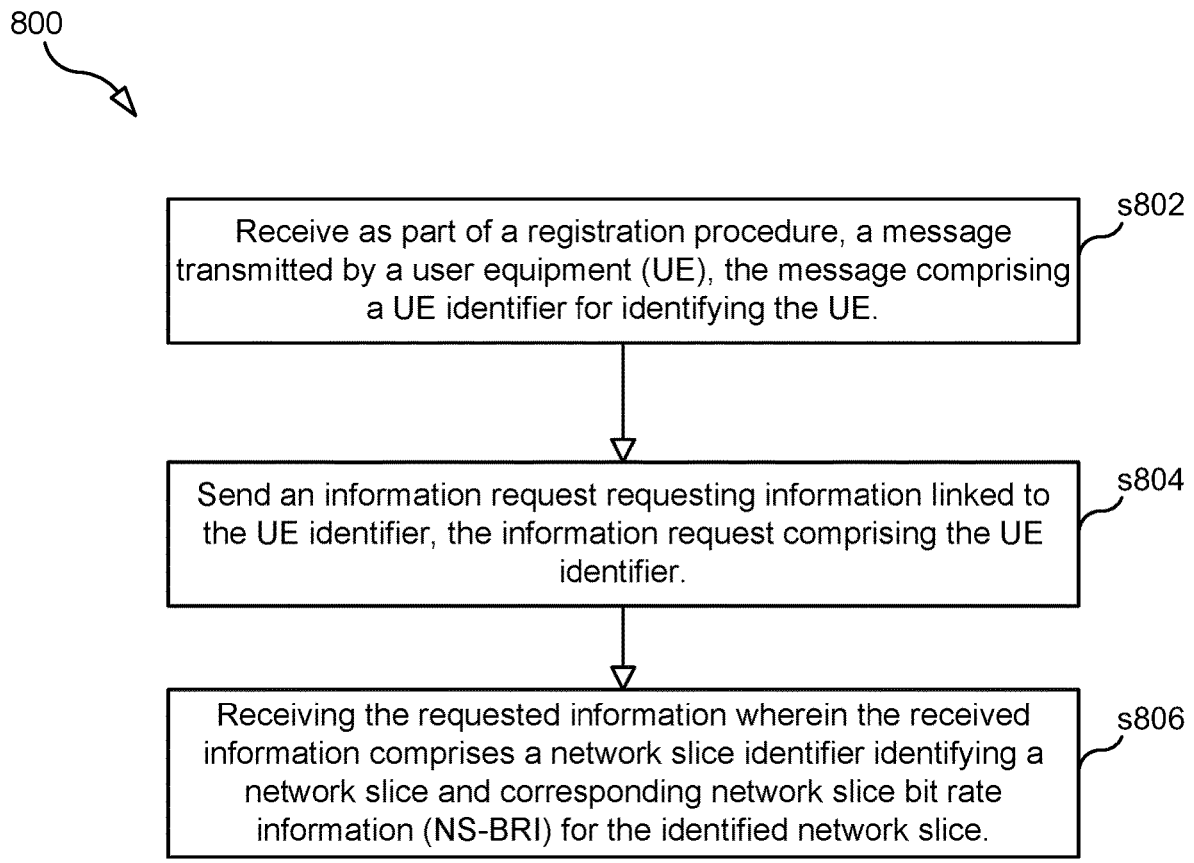
FIG. 8 is a flowchart illustrating a process according to an embodiment.

FIG. 8 shows an exemplary process 800 for providing network slice bit rate information. Process 800 may begin in step s802.

Step s802 comprises receiving, as part of a registration procedure, a message transmitted by a UE, the message comprising a UE identifier for identifying the UE.

Step s804 comprises, after receiving the UE identifier, sending an information request requesting information linked to the UE identifier, the information request comprising the UE identifier.

Step s806 comprises receiving the requested information, wherein the received information comprises a network slice identifier identifying a network slice and corresponding network slice bit rate information (NS-BRI) for the identified network slice. The NS-BRI comprises i) first maximum bit rate information (MBRI) specifying a first maximum bit rate for the network slice and the user equipment (e.g., UL and/or DL UE slice-AMBR), and/or ii) first guaranteed bit rate information (GBRI) specifying a first aggregate guaranteed bit rate for the network slice and the user equipment (e.g. UL and/or DL UE slice-AGBR).

In some embodiments, process 800 is performed by an access and mobility management function (AMF).

In some embodiments, the message received as part of a registration procedure in step s801 includes an NGAP Initial UE message.

In some embodiments, the information request of step s804 comprises an AM policy retrieval request message. In some embodiments, the information request of step s804 is a Nudm_SubscriberDataManagement_Get Request.

In some embodiments, process 800 further provides for sending the NS-BRI to a network entity of an access network (e.g., a gNB) and/or sending the NS-BRI to the UE. In some embodiments, sending the NS-BRI to the network entity comprises sending an Initial Context Setup Request that comprises the NS-BRI. In some embodiments, sending the NS-BRI to the UE comprises sending to the UE a Registration Accept message that comprises the NS-BRI.

In some embodiments, the NS-BRI is for a specific access type (e.g., 3GPP access type or non-3GPP access type). In such an embodiment, the received information includes an access type identifier, a network slice identifier, and the NS-BRI corresponding to the identified access type and network slice (i.e., the NS-BRI is linked with the access type identifier and the network slice identifier). For example, the received information comprises an information element that contains: the access type identifier, the network slice identifier, and the NS-BRI corresponding to the access type and network slice identifier.

Method for Enforcing Bit Rate Limitation

Figure 10:
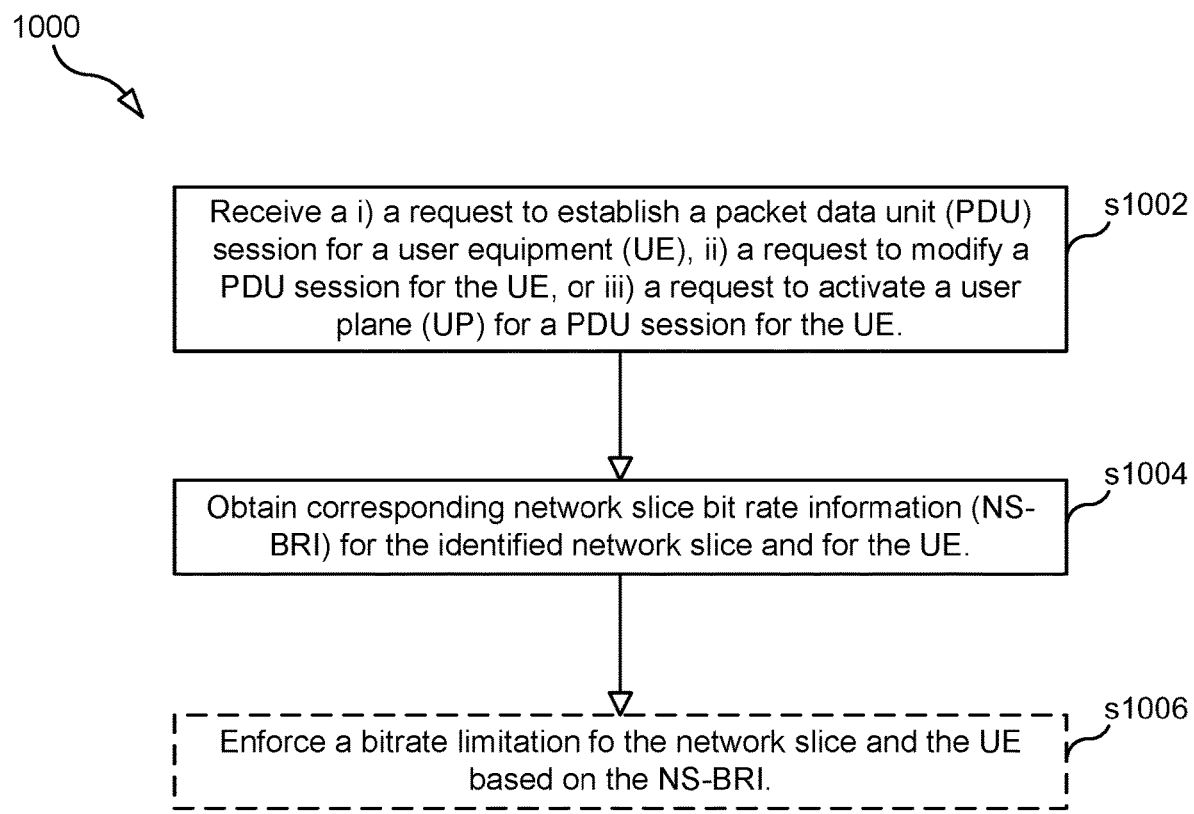
FIG. 10 is a flowchart illustrating a process according to an embodiment.

FIG. 10 shows an exemplary process 1000 for enforcing a bit rate limitation. Process 1000 may be performed by PCF 309. Process 1000 may begin in step s1002.

Step s1002 comprises receiving i) a request to establish a packet data unit (a.k.a., protocol data unit) (PDU) session for a user equipment (UE), ii) a request to modify a PDU session for the UE, or iii) a request to activate a user plane (UP) for a PDU session for the UE. The request includes a network slice identifier identifying a network slice and information associated with the UE. In some embodiments, the request comprises a PDU Session Request message. In some embodiments, the information associated with the UE is a UE identifier that identifies the UE (e.g., the UE's SUPI).

Steps s1004 comprises, based on the network slice identifier and the information associated with the UE, obtaining corresponding network slice bit rate information (NS-BRI) for the identified network slice and for the UE. The NS-BRI comprises: i) first maximum bit rate information (MBRI) specifying a first maximum bit rate for the network slice and the user equipment and/or ii) first guaranteed bit rate information (GBRI) specifying a first aggregate guaranteed bit rate for the network slice and the user equipment.

Process 1000 may further include additional steps, such as step s1006. Step s1006 comprises enforcing the bitrate limitation for the network slice and the UE based on the NS-BRI.

In some embodiments, step s1006 comprises determining whether a bit rate associated with the request (e.g., a requested Session-AMBR), when combined with bit rate allocations for each existing PDU session, exceeds either of: the first maximum bit rate for the network slice and the UE and/or the first aggregate guaranteed bit rate for the network slice and the UE. The method then provides for accepting the request, based on determining that the bit rate associated with the PDU session request, when combined with bit rate allocations for each existing PDU session, does not exceed either of: the first maximum bit rate for the network slice and the UE and/or the first aggregate guaranteed bit rate for the network slice and the UE.

In some embodiments, the request is a request to establish a PDU session and the step of enforcing the bit rate limitation comprises selecting, based on the NS-BRI, a Session-AMBR for the PDU session.

In some embodiments, the NS-BRI comprises a UE slice-AMBR value, and the step of enforcing the bitrate limitation comprises: determining a total Session-AMBR value associated with the UE and the identified network slice and selecting a Session-AMBR for the PDU session based on the total Session-AMBR value and the UE slice-AMBR value.

In some embodiments, process 1000 also includes transmitting a response to the request, wherein the response comprises information specifying the selected Session-AMBR for the PDU session.

Figure 12:
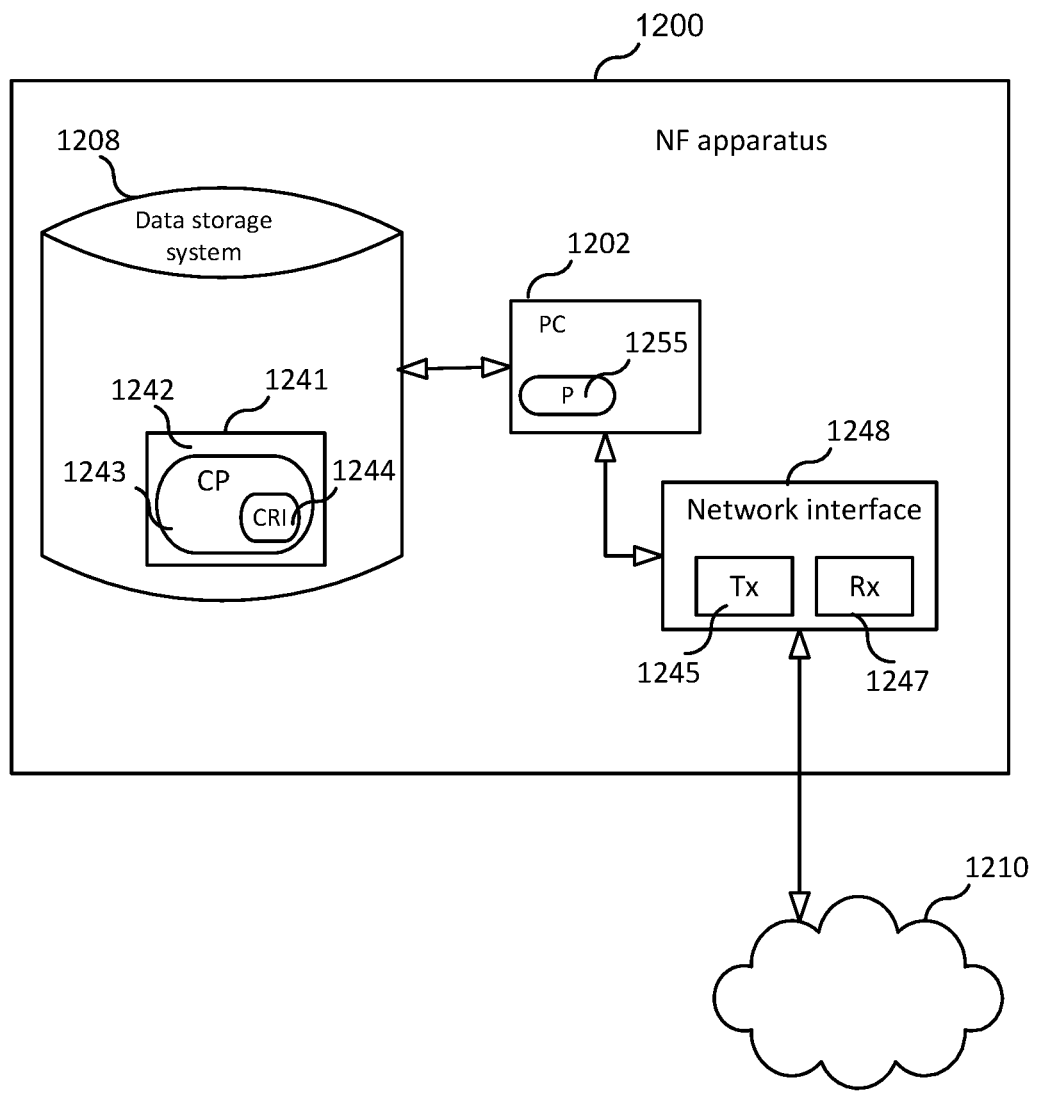
FIG. 12 is a block diagram of an apparatus according to an embodiment.

In embodiments in which the network functions described herein are implemented in software, FIG. 12 is a block diagram of a physical machine (or "apparatus") 1200, according to some embodiments, which can be used to run these functions. For instance, apparatus 1200 may run a virtual machine that runs network functions 303, 305, 309, 404, and 501. As shown in FIG. 12, apparatus 1200 may comprise: processing circuitry (PC) 1202, which may include one or more processors (P) 1255 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1200 may be a distributed computing apparatus); a network interface 1248 comprising a transmitter (Tx) 1245 and a receiver (Rx) 1247 for enabling apparatus 1200 to transmit data to and receive data from other machines connected to a network 110 (e.g., an Internet Protocol (IP) network) to which network interface 1248 is connected (directly or indirectly) (e.g., network interface 1248 may be wirelessly connected to the network 110, in which case network interface 1248 is connected to an antenna arrangement); and a local storage unit (a.k.a., "data storage system") 1208, which may include one or more non-volatile storage devices and/or one or more volatile storage devices. In embodiments where PC 1202 includes a programmable processor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, magnetic media (e.g., a hard disk), optical media, memory devices (e.g., random access memory, flash memory), and the like. In some embodiments, the CRI 1244 of computer program 1243 is configured such that when executed by PC 1202, the CRI causes apparatus 1200 to perform steps described herein (e.g., steps described herein with reference to the flow charts). In other embodiments, apparatus 1200 may be configured to perform steps described herein without the need for code. That is, for example, PC 1202 may consist merely of one or more ASICs. Hence, the features of the embodiments described herein may be implemented in hardware and/or software.

Figure 13:
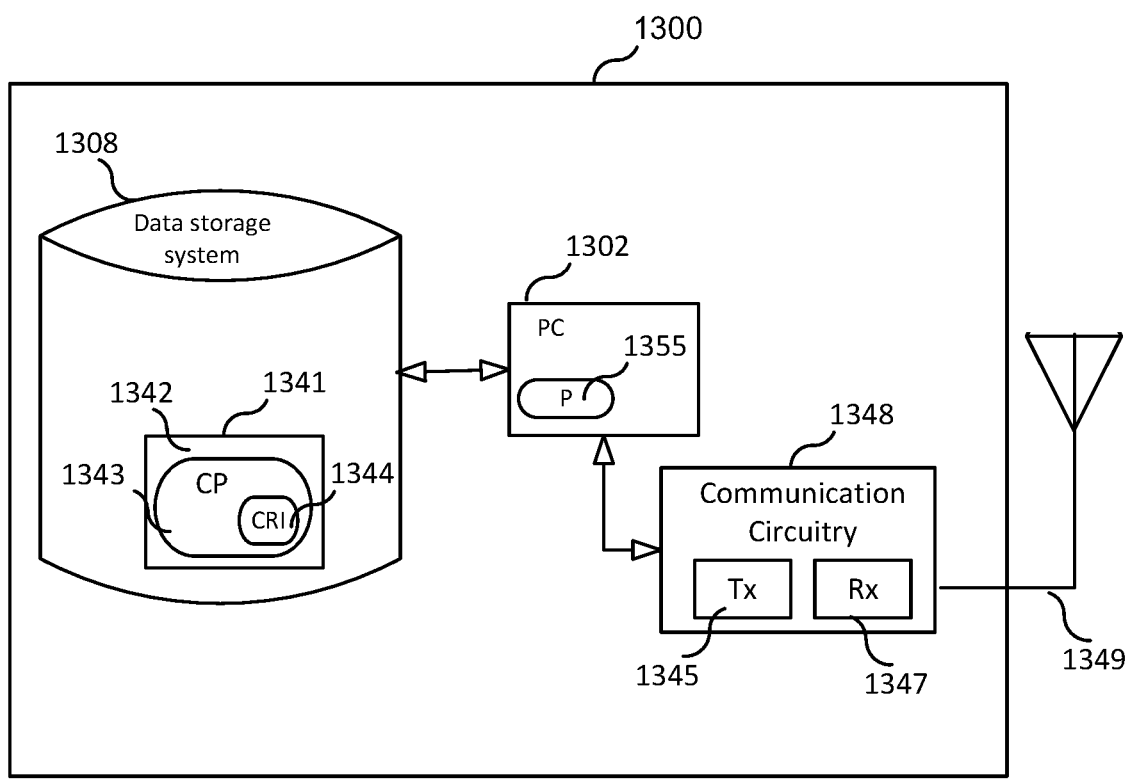
FIG. 13 is a block diagram of a UE according to an embodiment.

FIG. 13 is a block diagram of UE 301, according to some embodiments. As shown in FIG. 13, UE 301 may comprise: processing circuitry (PC) 1302, which may include one or more processors (P) 1355 (e.g., one or more general purpose microprocessors and/or one or more other processors, such as an application specific integrated circuit (ASIC), field-programmable gate arrays (FPGAs), and the like); communication circuitry 1348, which is coupled to an antenna arrangement 1349 comprising one or more antennas and which comprises a transmitter (Tx) 1345 and a receiver (Rx) 1347 for enabling UE 301 to transmit data and receive data (e.g., wirelessly transmit/receive data); and a local storage unit (a.k.a., "data storage system") 1308, which may include one or more non-volatile storage devices and/or one or more volatile storage devices. In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like. In some embodiments, the CRI 1344 of computer program 1343 is configured such that when executed by PC 1302, the CRI causes UE 301 to perform steps described herein (e.g., steps described herein with reference to the flow charts). In other embodiments, UE 301 may be configured to perform steps described herein without the need for code. That is, for example, PC 1302 may consist merely of one or more ASICs. Hence, the features of the embodiments described herein may be implemented in hardware and/or software.

Summary of Various Embodiments

A1. A method, performed by network entity, for providing network slice bit rate information, the method comprising: receiving, as part of a registration procedure, a message transmitted by a user equipment (UE), the message comprising a UE identifier for identifying the UE; after receiving the UE identifier, sending an information request requesting information linked to the UE identifier, the information request comprising the UE identifier; and receiving the requested information, wherein the received information comprises a network slice identifier identifying a network slice and corresponding network slice bit rate information (NS-BRI) for the identified network slice, wherein the NS-BRI comprises: i) first maximum bit rate information (MBRI) specifying a first maximum bit rate for the network slice, and/or ii) first guaranteed bit rate information (GBRI) specifying a first aggregate guaranteed bit rate for the network slice.

A2. The method of embodiment A1, wherein the first maximum bit rate information (MBRI) specifies a UE specific first maximum bit rate for the network slice and the UE, and/or first guaranteed bit rate information (GBRI) specifies a UE specific first aggregate guaranteed bit rate for the network slice and the UE.

A3. The method of embodiment A1 or A2, wherein the network entity comprises an access and mobility management function (AMF) and/or a policy control function (PCF).

A4. The method of embodiment A1, A2, or A3, wherein the information request comprises an AM policy retrieval request message.

A5. The method of embodiment A1-A2, wherein the information request comprises a Nudm_SubscriberData-Management_Get Request.

A6. The method of embodiments A1-A5, further comprising sending the NS-BRI to a network entity of an access network (e.g., a base station) and/or sending the NS-BRI to the UE.

A7. The method of embodiments A1-A6, wherein sending the NS-BRI to the network entity of the access network comprises sending an Initial Context Setup Request that comprises the NS-BRI.

A8. The method of embodiments A1-A6, wherein sending the NS-BRI to the UE comprises sending to the UE a Registration Accept message that comprises the NS-BRI.

A9. The method of any one of embodiments A1-A8, wherein the NS-BRI is for a specific access type (e.g., 3GPP access type or non-3GPP access type).

B1. A method, performed by a network entity (e.g., UE or gNB), for enforcing a bit rate limitation associated with a user equipment (UE) and a network slice, the method comprising: receiving a message comprising: i) a network slice identifier identifying the network slice and ii) corresponding network slice bit rate information (NS-BRI) for the identified network slice and for the UE, wherein the NS-BRI comprises: i) first maximum bit rate information (MBRI) specifying a first maximum bit rate for the network slice and the UE and/or ii) first guaranteed bit rate information (GBRI) specifying a first aggregate guaranteed bit rate for the network slice and the UE; and enforcing the bitrate limitation based on the NS-BRI.

B2. The method of embodiment B1, wherein the network entity is a network entity of an access network (e.g., a gNB) and the received message is an Initial UE Context Setup Request, a UE Context Modification Request, or a Handover Request.

B3. The method of embodiment B1, wherein the network entity is the UE and the received message is an RRC Reconfiguration message or a Registration Accept Message.

B4. The method of embodiments B1-B2, wherein enforcing the bitrate limitation based on the NS-BRI comprises: using the network slice identifier and a UE identifier identifying the UE, obtaining an aggregate bit rate value for the identified network slice and for the UE; and scheduling transmissions to or transmission from the UE based on the aggregate bit rate value for the UE and the network slice and the NS-BRI.

B5. The method of embodiments B1-B4, wherein enforcing the bitrate limitation based on the NS-BRI comprises determining a session-AMBR and/or a session-AGBR for the UE based on the NS-BRI.

B6. The method of any one of embodiments B1-B5, wherein the NS-BRI is for a specific access type (e.g., 3GPP access type or non-3GPP access type).

C1a. A method, performed by a network entity, for enforcing a bit rate limitation, the method comprising: receiving a request including a network slice identifier identifying a network slice and information associated with a user equipment (UE), wherein the request is: i) a request to establish a packet data unit (PDU) session for the UE, ii) a request to modify the PDU session, or iii) a request to activate a user plane (UP) for the PDU session; and based on the network slice identifier and the information associated with the UE, obtaining corresponding network slice bit rate information (NS-BRI) for the identified network slice and for the UE, wherein the NS-BRI comprises: i) first maximum bit rate information (MBRI) specifying a first maximum bit rate for the network slice and the user equipment and/or ii) first guaranteed bit rate information (GBRI) specifying a first aggregate guaranteed bit rate for the network slice and the user equipment.

C1b. The method of embodiment C1a, further comprising enforcing the bitrate limitation for the network slice and the UE based on the NS-BRI.

C2. The method of embodiment C1a or C1b, wherein the request comprises a PDU Session Request message.

C3. The method of any one of embodiments C1a-C2, wherein the information associated with the UE is a UE identifier that identifies the UE.

C4. The method of any one of embodiments C1b-C3, wherein the NS-BRI comprises a UE slice-AMBR value, and enforcing the bitrate limitation comprises: determining a total Session-AMBR value associated with the UE and the identified network slice and selecting a Session-AMBR for the PDU session based on the total Session-AMBR value and the UE slice-AMBR value.

C5. The method of any one of embodiments C1a-C4, further comprising: determining whether a bit rate associated with the request, when combined with bit rate allocations for each existing PDU session, exceeds either of: the first maximum bit rate for the network slice and the UE and/or the first aggregate guaranteed bit rate for the network slice and the UE; accepting the request based on determining that the bit rate associated with the PDU session request, when combined with bit rate allocations for each existing PDU session, does not exceed either of: the first maximum bit rate for the network slice and the UE and/or the first aggregate guaranteed bit rate for the network slice and the UE.

C6. The method of any one of embodiments C1b-05, wherein the network entity comprises a PCF.

C7. The method of embodiment C6, wherein the request is a request to establish a PDU session, enforcing the bit rate limitation based on the NS-BRI comprises the PCF selecting, based on the NS-BRI, a Session-AMBR for the PDU session, and the method further comprises the PCF transmitting a response to the request, wherein the response comprises information specifying the determined Session-AMBR for the PDU session.

D1. A method for enforcing a network slice bit rate limitation, the method comprising: receiving a request comprising i) a network slice identifier identifying a network slice and ii) bit rate value associated with the identified network slice; using the network slice identifier, obtaining a network slice, NS, bit rate value for the identified network slice and a total bit rate value for the identified network slice; and determining, based on the bit rate value included in the request, the obtained NS bit rate value, and the obtained total bit rate value, whether or not to deny the request.

D2. The method of embodiment D1, wherein the request comprises a registration request.

D3. The method of embodiment D1, wherein the request comprises a PDU session establishment request.

D4. The method of embodiment D1, wherein the request comprises a QoS Flow establishment request.

E1. A computer program (1243, 1343) comprising instructions (1244, 1344) which when executed by processing circuitry (1202, 1302) causes the processing circuitry to perform the method of any one of the above embodiments.

E2. A carrier containing the computer program of embodiment E1, wherein the carrier is one of an electronic signal, an optical signal, a radio signal, and a computer readable storage medium (1242, 1342).

F1. A UE (301) adapted to perform the method of any one of embodiments B1-B6.

G1. A UE (301), the UE comprising processing circuitry (1302); and a memory (1342), said memory containing instructions (1344) executable by said processing circuitry, whereby said UE is operative to perform the method of any one of embodiments B1-B6.

H1. An apparatus (1200) adapted to perform the method of any one of embodiments A1-D4.

I1. An apparatus (1200), the base station comprising processing circuitry (1202); and a memory (1242), said memory containing instructions (1244) executable by said processing circuitry, whereby said base station is operative to perform the method of any one of embodiments A1-D4.

While various embodiments of the present disclosure are described herein, it should be understood that they have been presented by way of example only, and not limitation. Thus, the breadth and scope of the present disclosure should not be limited by any of the above-described exemplary embodiments. Generally, all terms used herein are to be interpreted according to their ordinary meaning in the relevant technical field, unless a different meaning is clearly given and/or is implied from the context in which it is used. The indefinite article "a" should be interpreted openly as meaning "at least one" unless explicitly stated otherwise. Any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. That is, the steps of any methods disclosed herein do not have to be performed in the exact order disclosed, unless a step is explicitly described as following or preceding another step and/or where it is inherent that a step must follow or precede another step.

REFERENCES

3GPP TS 23.501 (currently available at www.3gpp.org/DynaReport/23501.htm)
3GPP TS 23.502. (currently available at www.3gpp.org/DynaReport/23502.htm)

GSMA PRD NG.116 (currently available at www.gsma.com/newsroom/wp-content/uploads//NG.116-v1.0-4.pdf)

3GPP T 28.552 (currently available at www.3gpp.org/DynaReport/28552.htm)

3GPP TS 28.541 (currently available at www.3gpp.org/DynaReport/28541.htm)

The invention claimed is:

1. A method performed by network entity for providing network slice bit rate information, the method comprising:
   receiving, as part of a registration procedure, a message transmitted by a user equipment (UE), the message identifying the UE;
   sending an information request requesting information linked to the identified UE, the information request comprising a corresponding UE identifier; and
   receiving the requested information, wherein
   the received information comprises a network slice identifier identifying a network slice and UE specific network slice bit rate information (NS-BRI) for the identified network slice and the identified UE, and
   the UE specific NS-BRI comprises guaranteed bit rate information (GBRI) specifying a UE specific aggregate guaranteed bit rate (GBR) for the network slice and the identified UE.

2. The method of claim 1, wherein the network entity comprises an access and mobility management function and/or a policy control function.

3. The method of claim 1, wherein the information request comprises a policy retrieval request message.

4. The method of claim 1, wherein the information request comprises a Nudm SubscriberDataManagement Get Request.

5. The method of claim 1, further comprising sending the NS-BRI to a network entity of an access network and/or sending the NS-BRI to the UE.

6. The method of claim 1, wherein sending the NS-BRI to the network entity of the access network comprises sending an Initial Context Setup Request that comprises the NS-BRI.

7. The method of claim 1, wherein sending the NS-BRI to the UE comprises sending to the UE a Registration Accept message that comprises the NS-BRI.

8. The method of claim 1, wherein the NS-BRI is for a specific access type.

9. The method of claim 1, wherein the corresponding UE identifier is a Subscription Permanent Identifier (SUPI).

10. A method performed by a network entity for enforcing a bit rate limitation associated with a user equipment (UE) and a network slice, the method comprising:
    receiving a message comprising: i) a network slice identifier identifying the network slice and ii) UE specific network slice bit rate information (NS-BRI) for the identified network slice and for the UE, wherein the UE specific NS-BRI comprises guaranteed bit rate information (GBRI) specifying a UE specific aggregate guaranteed bit rate for the network slice and the UE; and
    enforcing the bitrate limitation based on the NS-BRI.

11. The method of claim 10, wherein the network entity is a network entity of an access network and the received message is an Initial UE Context Setup Request, a UE Context Modification Request, or a Handover Request.

12. The method of claim 10, wherein the network entity is the UE and the received message is an RRC Reconfiguration message or a Registration Accept message.

13. The method of claim 10, wherein enforcing the bitrate limitation based on the UE specific NS-BRI comprises:
    using the network slice identifier and a UE identifier identifying the UE, obtaining an aggregate bit rate value for the identified network slice and for UE; and
    scheduling transmissions to or transmission from the UE based on the aggregate bit rate value for the UE and the network slice and the NS-BRI.

14. The method of claim 10, wherein enforcing the bitrate limitation based on the UE specific NS-BRI comprises determining a session aggregate maximum bit rate and/or a session aggregate guaranteed bit rate for the UE based on the NS-BRI.

15. The method of claim 10, wherein the NS-BRI is for a specific access type.

16. The method of claim 14, further comprising rejecting a session request from the UE upon determining that the UE specific NS-BRI is to be exceeded.

* * * * *